(12) United States Patent
Ciabarra, Jr. et al.

(10) Patent No.: US 11,232,253 B2
(45) Date of Patent: *Jan. 25, 2022

(54) DOCUMENT CAPTURE USING CLIENT-BASED DELTA ENCODING WITH SERVER

(71) Applicant: Quantum Metric, Inc., Monument, CO (US)

(72) Inventors: Mario Luciano Ciabarra, Jr., Colorado Springs, CO (US); Yiduo Wang, Portland, OR (US)

(73) Assignee: Quantum Metric, Inc., Monument, CO (US)

( * ) Notice: Subject to any disclaimer, the term of this patent is extended or adjusted under 35 U.S.C. 154(b) by 247 days.

This patent is subject to a terminal disclaimer.

(21) Appl. No.: 16/410,342

(22) Filed: May 13, 2019

(65) Prior Publication Data

US 2019/0266197 A1 Aug. 29, 2019

Related U.S. Application Data

(63) Continuation of application No. 15/212,569, filed on Jul. 18, 2016, now Pat. No. 1,018,592.

(Continued)

(51) Int. Cl.
*G06F 40/143* (2020.01)
*G06F 40/131* (2020.01)
(Continued)

(52) U.S. Cl.
CPC ............ *G06F 40/143* (2020.01); *G06F 16/93* (2019.01); *G06F 16/9574* (2019.01);
(Continued)

(58) Field of Classification Search
CPC .... G06F 40/131; G06F 40/194; G06F 40/197; G06F 16/986; G06F 16/9574; G06F 16/93
(Continued)

(56) References Cited

U.S. PATENT DOCUMENTS 5,765,173 A 6/1998 Cane et al.
5,794,254 A 8/1998 McClain
(Continued)

FOREIGN PATENT DOCUMENTS

| CA | 2437281 | 1/2011 | |
|---|---|---|---|
| EP | 3323053 | 5/2018 | |
| WO | WO-02075539 A2 * | 9/2002 | ......... G06F 16/1787 |

OTHER PUBLICATIONS

U.S. Appl. No. 16/206,876, Non-Final Office Action, dated Sep. 25, 2020, 17 pages.
(Continued)

*Primary Examiner* — Phuong Thao Cao
(74) *Attorney, Agent, or Firm* — Kilpatrick Townsend & Stockton LLP

(57) ABSTRACT

When different client devices request the same document, most of content of the response from the server (i.e. the response document from a web server) will be the same. Embodiments allow the client devices to use fingerprints, i.e. hashes, sent by a capture system to pinpoint only the changing portions of the document instead of sending the entire document. In various embodiments, the client compares client-generated fingerprints for the document with capture system-generated fingerprints for most likely appearing portions of text of the document or related documents to fully represent and sends to the capture system the client document in a compact and efficient way.

20 Claims, 9 Drawing Sheets

Related U.S. Application Data

(60) Provisional application No. 62/193,510, filed on Jul. 16, 2015.

(51) Int. Cl.
  *G06F 40/194* (2020.01)
  *G06F 16/958* (2019.01)
  *G06F 16/93* (2019.01)
  *G06F 16/957* (2019.01)
  *G06F 40/123* (2020.01)
  *G06F 40/197* (2020.01)

(52) U.S. Cl.
  CPC .......... *G06F 16/986* (2019.01); *G06F 40/123* (2020.01); *G06F 40/131* (2020.01); *G06F 40/194* (2020.01); *G06F 40/197* (2020.01)

(58) Field of Classification Search
  USPC ....................................................... 707/747
  See application file for complete search history.

(56) References Cited

U.S. PATENT DOCUMENTS

| | | | |
|---|---|---|---|
| 6,012,087 A | 1/2000 | Freivald et al. | |
| 7,269,784 B1 | 9/2007 | Kasriel et al. | |
| 7,296,051 B1 | 11/2007 | Kasriel | |
| 7,383,496 B2 | 6/2008 | Fukuda | |
| 7,437,364 B1* | 10/2008 | Fredricksen | G06F 16/9574 |
| 7,523,191 B1 | 4/2009 | Thomas et al. | |
| 7,565,423 B1 | 7/2009 | Fredricksen | |
| 7,587,398 B1 | 9/2009 | Fredricksen et al. | |
| 7,640,262 B1 | 12/2009 | Beaverson et al. | |
| 7,657,517 B2 | 2/2010 | Brown et al. | |
| 7,668,880 B1* | 2/2010 | Carroll | G06F 11/1469 |
| | | | 707/640 |
| 7,734,826 B2 | 6/2010 | Brown et al. | |
| 7,765,274 B2 | 7/2010 | Kasriel et al. | |
| 7,844,580 B2 | 11/2010 | Srivastava et al. | |
| 7,941,525 B1 | 5/2011 | Yavilevich | |
| 7,979,413 B2 | 7/2011 | Krishnamurthy et al. | |
| 8,112,496 B2 | 2/2012 | Manasse et al. | |
| 8,224,964 B1 | 7/2012 | Fredrickson et al. | |
| 8,230,510 B1 | 7/2012 | Yang et al. | |
| 8,266,245 B1 | 9/2012 | Saviano et al. | |
| 8,381,302 B1 | 2/2013 | Kennedy et al. | |
| 8,423,616 B2 | 4/2013 | Pouzin et al. | |
| 8,595,187 B1 | 11/2013 | McLennan et al. | |
| 8,661,428 B2 | 2/2014 | Clark | |
| 8,826,033 B1 | 9/2014 | Krishnaprasad et al. | |
| 8,868,533 B2 | 10/2014 | Powell et al. | |
| 8,914,324 B1 | 12/2014 | Guo et al. | |
| 8,959,332 B2 | 2/2015 | Augenstein et al. | |
| 9,112,826 B2 | 8/2015 | Gero | |
| 9,153,239 B1 | 10/2015 | Postelnicu et al. | |
| 9,471,285 B1 | 10/2016 | Koohgoli et al. | |
| 9,508,081 B2 | 11/2016 | Yavilevich | |
| 9,633,062 B1 | 4/2017 | Vollmer | |
| 9,684,668 B1 | 6/2017 | Guo | |
| 9,785,722 B2* | 10/2017 | White | G06F 16/958 |
| 9,792,365 B2 | 10/2017 | Yavilevich | |
| 9,917,894 B2 | 3/2018 | Tripathy et al. | |
| 9,946,724 B1 | 4/2018 | Ghosh et al. | |
| 9,959,577 B1 | 5/2018 | Mori | |
| 9,971,940 B1 | 5/2018 | Sbaiz et al. | |
| 10,063,645 B2 | 8/2018 | Yavilevich et al. | |
| 10,079,737 B2 | 9/2018 | Schlesinger et al. | |
| 10,146,752 B2 | 12/2018 | Ciabarra, Jr. et al. | |
| 10,318,592 B2 | 6/2019 | Ciabarra, Jr. et al. | |
| 10,599,753 B1* | 3/2020 | Eisner | G06F 40/169 |
| 10,691,877 B1* | 6/2020 | Eisner | G06Q 10/101 |
| 2002/0013825 A1 | 1/2002 | Freivald et al. | |
| 2002/0138511 A1 | 9/2002 | Psounis et al. | |
| 2002/0174180 A1* | 11/2002 | Brown | G06F 16/1787 |
| | | | 709/203 |
| 2003/0046260 A1 | 3/2003 | Satyanarayanan et al. | |
| 2003/0172066 A1 | 9/2003 | Cooper et al. | |
| 2003/0200207 A1* | 10/2003 | Dickinson | G06F 8/658 |
| 2004/0025171 A1 | 2/2004 | Barinov et al. | |
| 2004/0162885 A1* | 8/2004 | Garg | G06F 16/27 |
| | | | 709/213 |
| 2004/0243936 A1* | 12/2004 | Fukuda | G06F 16/9535 |
| | | | 715/249 |
| 2004/0249793 A1 | 12/2004 | Both | |
| 2004/0267726 A1 | 12/2004 | Beynon et al. | |
| 2005/0066037 A1 | 3/2005 | Song et al. | |
| 2005/0203851 A1 | 9/2005 | King et al. | |
| 2005/0262167 A1 | 11/2005 | Teodosiu et al. | |
| 2005/0273592 A1 | 12/2005 | Pryor et al. | |
| 2005/0283500 A1 | 12/2005 | Eshghi et al. | |
| 2006/0112150 A1 | 5/2006 | Brown et al. | |
| 2007/0130188 A1 | 6/2007 | Moon et al. | |
| 2007/0226510 A1 | 9/2007 | Iglesia et al. | |
| 2007/0288533 A1* | 12/2007 | Srivastava | G06F 16/27 |
| 2008/0033913 A1 | 2/2008 | Winburn | |
| 2008/0091845 A1 | 4/2008 | Mills et al. | |
| 2008/0208979 A1 | 8/2008 | Vishwanath et al. | |
| 2008/0235200 A1 | 9/2008 | Washington et al. | |
| 2008/0243898 A1 | 10/2008 | Gormish et al. | |
| 2008/0243992 A1 | 10/2008 | Jardetzky et al. | |
| 2008/0270436 A1 | 10/2008 | Fineberg et al. | |
| 2009/0012984 A1 | 1/2009 | Ravid et al. | |
| 2009/0013414 A1 | 1/2009 | Washington et al. | |
| 2009/0177959 A1 | 7/2009 | Chakrabarti et al. | |
| 2009/0196296 A1 | 8/2009 | Vachuska | |
| 2009/0228680 A1 | 9/2009 | Reddy et al. | |
| 2009/0248793 A1 | 10/2009 | Jacobsson et al. | |
| 2009/0271779 A1* | 10/2009 | Clark | G06F 16/137 |
| | | | 717/171 |
| 2009/0299994 A1 | 12/2009 | Krishnamurthy et al. | |
| 2010/0088551 A1 | 4/2010 | Berkner et al. | |
| 2010/0095208 A1* | 4/2010 | White | G06F 16/9577 |
| | | | 715/704 |
| 2010/0222902 A1 | 9/2010 | Eldridge et al. | |
| 2011/0066628 A1 | 3/2011 | Jayaraman et al. | |
| 2011/0119327 A1* | 5/2011 | Masuda | H04L 67/1002 |
| | | | 709/203 |
| 2011/0246879 A1* | 10/2011 | White | G06F 16/958 |
| | | | 715/704 |
| 2011/0252100 A1 | 10/2011 | Raciborski et al. | |
| 2011/0252305 A1 | 10/2011 | Tschäni et al. | |
| 2011/0314070 A1* | 12/2011 | Brown | G06F 16/16 |
| | | | 707/827 |
| 2011/0320880 A1 | 12/2011 | Wenig et al. | |
| 2012/0016882 A1 | 1/2012 | Tofano | |
| 2012/0060082 A1 | 3/2012 | Edala et al. | |
| 2012/0084333 A1 | 4/2012 | Huang et al. | |
| 2013/0013618 A1* | 1/2013 | Heller | G06F 16/174 |
| | | | 707/747 |
| 2013/0013859 A1 | 1/2013 | Zhu et al. | |
| 2013/0031056 A1 | 1/2013 | Srivastava et al. | |
| 2013/0124472 A1 | 5/2013 | Srivastava et al. | |
| 2013/0132833 A1* | 5/2013 | White | G06F 11/3438 |
| | | | 715/704 |
| 2013/0138620 A1 | 5/2013 | Yakushev et al. | |
| 2013/0138775 A1 | 5/2013 | Shah | |
| 2013/0185387 A1 | 7/2013 | Gero | |
| 2013/0188926 A1 | 7/2013 | Rajagopalan | |
| 2013/0232187 A1 | 9/2013 | Workman et al. | |
| 2013/0238730 A1 | 9/2013 | Nir et al. | |
| 2013/0262567 A1 | 10/2013 | Walker et al. | |
| 2013/0275479 A1 | 10/2013 | Thadikaran et al. | |
| 2013/0332398 A1* | 12/2013 | Wu | G06N 20/00 |
| | | | 706/12 |
| 2013/0346374 A1 | 12/2013 | Wolf et al. | |
| 2014/0032513 A1* | 1/2014 | Gaither | G06F 16/90344 |
| | | | 707/698 |
| 2014/0074783 A1 | 3/2014 | Alsina et al. | |
| 2014/0181034 A1* | 6/2014 | Harrison | G06F 16/27 |
| | | | 707/646 |
| 2014/0259157 A1 | 9/2014 | Toma et al. | |
| 2014/0358938 A1 | 12/2014 | Billmaier et al. | |
| 2014/0379823 A1 | 12/2014 | Wilsher et al. | |

(56) References Cited

U.S. PATENT DOCUMENTS

| | | | |
|---|---|---|---|
| 2015/0033120 | A1 | 1/2015 | Cooke et al. |
| 2015/0067031 | A1 | 3/2015 | Acharya et al. |
| 2015/0120804 | A1* | 4/2015 | Eschbach ............ H04L 67/2842 709/203 |
| 2015/0134669 | A1 | 5/2015 | Harris et al. |
| 2015/0142756 | A1 | 5/2015 | Watkins et al. |
| 2015/0181269 | A1 | 6/2015 | McMillan |
| 2015/0207837 | A1 | 7/2015 | Guerrera et al. |
| 2015/0261653 | A1* | 9/2015 | Lachambre ............... G06F 8/70 717/126 |
| 2015/0278384 | A1* | 10/2015 | Butt ...................... G06F 16/972 715/234 |
| 2015/0286511 | A1 | 10/2015 | Mickens |
| 2015/0347615 | A1* | 12/2015 | McGushion ........ G06F 16/9535 715/234 |
| 2015/0356116 | A1 | 12/2015 | Lin et al. |
| 2016/0055196 | A1 | 2/2016 | Collins et al. |
| 2016/0188411 | A1 | 6/2016 | Bortnikov et al. |
| 2016/0188548 | A1 | 6/2016 | Ciabarra, Jr. et al. |
| 2016/0205221 | A1 | 7/2016 | Gero |
| 2016/0308941 | A1 | 10/2016 | Cooley |
| 2016/0320945 | A1* | 11/2016 | Brunn ...................... G06T 11/60 |
| 2017/0011049 | A1 | 1/2017 | Venkatesh et al. |
| 2017/0017650 | A1 | 1/2017 | Ciabarra et al. |
| 2017/0019489 | A1* | 1/2017 | Churchill ............ G06F 3/04847 |
| 2017/0192876 | A1 | 7/2017 | Lachambre et al. |
| 2017/0323026 | A1* | 11/2017 | Le Bras ................ G06F 40/143 |

OTHER PUBLICATIONS

U.S. Appl. No. 14/984,102, "Final Office Action", dated Feb. 1, 2018, 19 pages.

U.S. Appl. No. 14/984,102, "Non-Final Office Action", dated Aug. 14, 2017, 18 pages.

U.S. Appl. No. 15/212,569, "Non-Final Office Action", dated May 23, 2018, 37 pages.

U.S. Appl. No. 15/212,569, "Notice of Allowance", dated Jan. 30, 2019, 23 pages.

European Application No. EP16825308.6, "Extended European Search Report", dated Jun. 4, 2018, 11 pages.

Fu et al., "Application-Aware Client-Side Data Reduction and Encryption of Personal Data in Cloud Backup Services", Journal of Computer Science and Technology, vol. 28, Issue 6, Nov. 2013, pp. 1012-1024.

Liu et al., "ADMAD: Application-Driven Metadata Aware De-duplication Archival Storage System", Storage Network Architecture and Parallel I/Os,, Sep. 2008, pp. 29-35.

Lo et al., "Imagen: Runtime Migration of Browser Sessions for JavaScript Web Applications", World Wide Web. International World Wide Web Conferences Steering Committee. Republic and Canton of Geneva Switzerland, May 13, 2013, pp. 815-826.

Mogul et al., "Potential Benefits of Delta Encoding and Data Compression for HTTP", Proceedings of the 1997 ACM SIGCOMM Conference, Sep. 1997, pp. 181-194.

International Application No. PCT/US2016/042776, "International Search Report and Written Opinion", dated Sep. 22, 2016, 14 pages.

International Application No. PCT/US2016/042776, "International Preliminary Report on Patentability", dated Jan. 25, 2018, 12 pages.

Savant et al., "Server-Friendly Delta Compression for Efficient Web Access", Proceedings of the International Workshop on Web Content Caching and Distribution, Sep. 2003, pp. 303-322.

Tridgell et al., "Efficient Algorithms for Sorting and Synchronization.", Thesis at the Australian National University, Feb. 1999, 115 pages.

U.S. Appl. No. 16/206,876, "Final Office Action", dated May 19, 2020, 17 pages.

U.S. Appl. No. 16/206,876, "Non-Final Office Action", dated Dec. 23, 2019, 22 pages.

European Application No. EP16825308.6, "Office Action", dated Jan. 3, 2020, 8 pages.

Israel Application No. IL256893, "Office Action", dated Feb. 24, 2020, 13 pages.

* cited by examiner

```html
<!DOCTYPE html PUBLIC "-//W3C//DTD XHTML 1.0 Strict//EN"
"http://www.w3.org/TR/xhtml1/DTD/xhtml1-strict.dtd">
<html xmlns="http://www.w3.org/1999/xhtml">
<head>
        <meta http-equiv="content-type" content="text/html;charset=utf-8" />
        <title>Quantum Metric</title>
        <script src="js/jquery-1.7.2.js"></script>
        <link rel="stylesheet" href="css/splash.css" type="text/css" />
        <link rel="icon" href="favicon.ico" type="image/x-icon">
        <link rel="shortcut icon" href="favicon.ico" type="image/x-icon">
</head>
<body>

<div id="container">
        <div id="content">
    <div id="delaunay">
    </div>
        </div>
        <div id="sidebar">
   <h1><i>Understand Your Customer.</i></h1>
   <h1>See your business from 30,000 ft —</h1>
   <h1>And at ground zero.</h1>

<div id="blurb">
      <p>Quantum Metric is an innovative offering for understanding your customer base like
never before.  From Mobile to Desktop, Quantum will give you a revolutionary view that will change
the way you do business.
      </p>

<div id="email-form">
         <form method="post" action="/">
           <p>
           <label for="email">Smart Metrics for Smart People. <p>Sign up for updates:
</p></label>
                  <input type="text" class="text" name="email" id="email" />
                  <input type="submit" class="submit" value="Submit" />
           </p>
         </form>
      </div>

<div id="logo">
      </div>
    </div>
         </div>
</div>
<div id="stripe">
   <div id="stripe-content">

</div>
</div>
<div id="footer">
   <div id="footer-right">
   <p>© 2015 Quantum Metric.  All rights reserved.</p>
   </div>
</div>
</body>
</html>
```

FIG. 5A

Fingerprint 1

WEAK: 564D3A556A9EAA0A1D68722CBC3C3979
STRONG: 07590AB35CF4F019C949A8D0BA762AD52B6E403C13C2F6D451C9C43A03272870

/ 510

```
<!DOCTYPE html PUBLIC "-//W3C//DTD XHTML 1.0 Strict//EN"
"http://www.w3.org/TR/xhtml1/DTD/xhtml1-strict.dtd">

<html xmlns="http://www.w3.org/1999/xhtml">
<head>
        <meta http-equiv="content-type" content="text/html;charset=utf-8" />
        <title>Quantum Metric<
```

/ 512

Fingerprint 2

WEAK: 9832C80B171974379B8F9DFD691C9D5C
STRONG: 45507011A4B139977F302ADB16069B073D53E3293DB793C92F921EB038718C76

/ 520

```
/title>
        <script src="js/jquery-1.7.2.js"></script>
        <link rel="stylesheet" href="css/splash.css" type="text/css" />
        <link rel="icon" href="favicon.ico" type="image/x-icon">
        <link rel="shortcut icon" href="favicon.ico" type="image/x-icon">
</head>
<bod
```

/ 522

Fingerprint 3

WEAK: 7F05B03E967A3C38102E7ECFE45B811B
STRONG: 5F2FBFA9F0B60D0733E9339C3E64570BA911FB82E099DD1F4A3327DA79035853

/ 530

```
y><div id="container">
        <div id="content">
        <div id="delaunay">
        </div>
        </div>
        <div id="sidebar">
        <h1><i>Understand Your Customer.</i></h1>
        <h1>See your business from 30,000 ft —</h1>
        <h1>And at ground zero.</h1>
```

/ 532

Fingerprint 4

WEAK: 49D55F7EF2EDE5E950BB55E98ECBE031
STRONG: 7BB26FF6302387DF10E80F2848281EB690CA835E7E0CF8EBE2EBF665E1B4BF64

/ 540
/ 542

```
<div id="blurb">
        <p>Quantum Metric is an innovative offering for understanding your customer base
like never before. From Mobile to Desktop, Quantum will give you a revolutionary view that
will change the way you do business
```

FIG. 5B

Fingerprint 5

WEAK: 9CC9D065D6F65794C7B5FDD9972E41F2
STRONG:
7DA41DD4B4D674FDAC6B44D7501338AA280782A9CA3DA3F6E30E89063AB105AD  — 550

```
ss.
        </p>
                                                          552
        <div id="email-form">

<form method="post" action="/">
                <p>
                <label for="email">Smart  Metrics for Smart People. <p>Sign up
for updates: </p></label>
```

Fingerprint 6

WEAK: 698E028E782ED0B1AB4B4A296950EC34
STRONG:
B2DFE44EDA69E0279813EB3F492A2DD7849F2561C97790C0CE85351906C2765E  — 560

```
<input type="text" class="text" name="email" id="email" />    562
                <input type="submit" class="submit" value="Submit" />
            </p>
        </form>
    </div>
```

Fingerprint 7

WEAK: 84FD22E9E7A401A4AB584C0F12996B94
STRONG:
869FB6AA3F826288D9BE20E6B5672AD6E8F41D71F118446486087D73AC0FC9C9  — 570

```
<div id="logo">
        </div>                                              572

</div>
        </div>
</div>
<div id="stripe">
    <div id="stripe-content">

</div>
</div>
<div id="footer">
    <div id="footer-right">
    <p>© 2015 Quantum Metric.  All rights reser
```

FIG. 5C

```
07590AB35CF4F019C949A8D0BA762AD52B6E403C13C2F6D451C9C43A03272870,
45607011A4B139977F302ADB16069B073D53E3293DB793C92F921EB038718C76,
5F2FBFA9F0B60D0733E9339C3E64570BA911FB82E099DD1F4A3327DA79035853,
7BB26FF6302387DF10E80F2848281EB690CA835E7E0CF8EBE2EBF665E1B4BF64,
7DA41DD4B4D674FDAC6B44D7501338AAA280782A9CA3DA3F6E30E89063AB105AD,
B2DFE44EDA69E0279813EB3F492A2DD7849F2561C97790C0CE85351906C2765E,
869FB6AA3F826288D9BE20E6B5672AD6E8F41D71F118446486087D73AC0FC9C9,
VED.</P>
  </DIV>
 </DIV>
 </BODY>
</HTML>
```

DOCUMENT CAPTURE USING CLIENT-BASED DELTA ENCODING WITH SERVER

CROSS-REFERENCE TO RELATED APPLICATIONS

The present application is a continuation of, and claims the benefit and priority of U.S. application Ser. No. 15/212,569, filed Jul. 18, 2016, entitled "DOCUMENT CAPTURE USING CLIENT-BASED DELTA ENCODING WITH SERVER," which claims the benefit and priority under 35 U.S.C. 119(e) of U.S. Provisional Application No. 62/193,510, filed Jul. 16, 2015, entitled "SYSTEMS AND METHODS FOR DOCUMENT CAPTURE USING CLIENT-BASED DELTA ENCODING WITH SERVER," the entire contents of which are incorporated herein by reference for all purposes.

FIELD

The present disclosure relates generally to a document capture system. More specifically, embodiments relate to techniques (e.g., systems, apparatuses, computer-readable media, and methods) for efficient capture of documents using delta encoding to identify changes and modifications in documents.

BACKGROUND

For years, operators of websites have presented content in a mostly blind fashion. While knowing what is intended to be seen, operators weren't exactly sure how content would be rendered for the website in an application (e.g., a document browser) on a client device and exactly how those users would interact with the content. As a result, operators may be challenged to determine the exact user experience on a client device for accessing documents presented for a website. It may be difficult for operators to determine the sequence of events for a user attempting to view the content on a client device. As such, some operators may be unable to determine a sequence of events leading up to problems with accessing content on a client device.

In the past decade, advancing technology has enabled various methods to capture the user experience in delivery of electronic documents (e.g., delivery of webpages in a client browser) in an online-environment (e.g., an Internet environment). This digital experience analytics can provide deep level insights into customer behavior, website performance, and identification of improvement opportunities for specific customer segments. Such techniques can enable discovery of points of failure, successes, and trends in which may then be used to optimize the design of the business's operations and service.

One technology used in the early discoveries of this field uses packet capture to capture documents in route between a server and client. However, packet capture requires the ability to mirror and capture traffic between a server and a client, typically requiring an interface into networking equipment. Conversely, an embedded agent in the client that sends the rendered document to a server for analysis can be delivered with the document and is easier to deploy and update. Additionally and importantly, the document a browser renders may not exactly match the document that was sent by a server, for example, as it was modified by client side browser plugins, proxies, or network devices along the way.

For a server to detect content that was viewed by a user at client side browser, the client may have to send the entire document. In a mobile environment, clients such as mobile devices may be limited in computing resources, including storage, memory, processors, and the like. Mobile devices often encounter challenges with communication with wireless networks, such as bandwidth constraints and network speed. Systems that communicate with clients to receive the entire document viewed on a client, such as a mobile device, may be severely burdened by the constraints of a mobile environment. Further, sending an entire client-received document to a server may be inefficient and may, for example, slow down the user experience while the client is consuming network resources uploading the document. Additional techniques can look for duplication of content and use compression techniques to reduce the amount of content sent. However, such techniques are overburdened with resending the entire document and consuming too many network and client processing resources.

BRIEF SUMMARY

The present disclosure relates generally to a document capture system. More specifically, embodiments relate to techniques (e.g., systems, apparatuses, computer-readable media, and methods) for efficient capture of documents using delta encoding to identify changes and modifications in documents accessed at a client (e.g., a client device or a client application).

When different clients request information from a server, most of content of the response will be the same (i.e. the web document delivered from a website). For servers that serve dynamic data, responses may differ by varying amounts. For example, the web document may include a personalization portion greeting the user with their name. In such embodiments, the only change in the document may be the name of the user. The techniques disclosed herein can detect changes in a document presented at a client and capture the changes in the document. The differences can be communicated from the client to a capture system that can store the differences in a document. The capture system can store content that is common, or more likely to appear in documents. Using the content most likely to appear in a document, the capture system can communicate such content to a client. The client uses the content to identify differences, or changes in a document, which can be communicated to the capture system. Some embodiments allow clients to use fingerprints, e.g. hashed data of content most likely to appear in a document sent by the capture system to pinpoint only the changing portions of the document instead of sending the entire document. The capture system can assemble or regenerate a modified document accessed at a client based on the differences and the content most likely to appear in a document.

Thus, embodiments minimize the amount of data being sent by the client to a capture system yet allow the capture system to recreate the exact document rendered in the client. Some embodiments provide for significant reductions in client data storage needs for network traffic data and simultaneously vastly reduce the time and processing resources required for a client to communicate content seen at the client.

The manner in which data is captured can reduce storage costs for storing data about documents presented to a user and can improve processing efficiency by reducing the amount of data stored for a website on a client. Further, the limited amount of data can be used to recreate the data communicated at any particular instance. For example, an entity can use the disclosed techniques to determine what (e.g., a web page) was transmitted to a client for presentation to a user, and by doing so, can determine what the user received. This can enable the entity to assess how users or computer systems use and interact with a website, as well as how the website behaves and responds to dynamic interactions. The documents captured can be used to determine what the user is presented at a client device, thereby enabling the entity to determine the exact user experience of the delivered documents. The captured documents can be available for later replay and analysis, enabling organizations to precisely determine how a user experiences a website at a client. The techniques disclosed herein enable an organization to dynamically recreate content rendered on a website using fractional storage of the original data size so that the organization can determine what was seen by a client. Such an ability enables an organization to recreate a user experience, which can prove to be useful for identifying problems in content provided on the website. Through analysis of data stored using techniques disclosed herein, an organization can discover points of failure, successes, and trends, any of which may then be used to optimize the design of the organization's operations and service.

In at least one embodiment, a capture system can communicate a decoder ring that is generated by the capture system. The decoder ring includes a document (e.g. a decoder ring dictionary) illustrating content having a likelihood greater than a threshold for appearing (i.e. the most likely to appear content) when a specific document or specific site is displayed on a client. The client then scans the received document, looking for matches from the decoder ring dictionary to the received document. Data portions (e.g., chunks or blocks of text) which make up the values of the decoder ring would be created by the client and server in a predetermined and deterministic method. One embodiment would allow the data portions of text to be of fixed length. Another, and in many cases more efficient method, would use predetermined contextual indicators to create the potential matching data portions. Thus, a hypertext markup language (HTML) document could be split into data portions, for example, by its HTML tags, return characters, groups of sentences, or other efficient methods. In one embodiment, the client can look at data portions sequentially to see if there is a match in the decoder ring dictionary. As the client finds matches, it uses the decoder ring key to represent the specific data portion, and thus greatly reduces the amount of data required to represent the client document to the server. When the client encounters areas that do not have a match in the decoder dictionary, the client appends the actual text in the current document one character at a time. To increase the efficiency of the network data transmitted between the client and server as well as minimize the CPU required for client comparisons, the decoder ring keys include fingerprints, or hashes, of the decoder ring values. The fingerprints are much smaller than the original text, and can be quickly generated and compared. Thus, as the smaller keys also represent the larger values of data portions, the client only needs the keys to be able to represent to the server which parts of the decoder ring to use for document reassembly, vastly reducing the amount of data communicated between the client and the server.

In one embodiment, to perform the task of generating and comparing fingerprints by the client most efficiently, a first pass is made by the client using a fast weak-hashing algorithm which allows for single character appending and single character concatenation from the front, allowing for a sliding window comparison. As a tradeoff to the speed, this first pass by the client may encounter hash collisions, and a secondary strong hash comparison is performed to ensure with 100% certainty that the client text block matches the server side text block stored at the capture system. In this embodiment, both the weak-hashing and strong-hashing fingerprints would be sent from the capture server to the client.

Thus, embodiments discussed herein conserve the resource of processing time and network consumption by the client enable the client, for example a client web browser, to be the most responsive to the user yet be thousands of times more efficient in sending a representation of the received document than conventional solutions.

In some embodiments, a computer system may be implemented for a document capture system. The computer system may be configured to implement techniques disclosed herein. The computer system may include a memory coupled to one or more processors, the memory storing instructions, where the instructions, when executed by the one or more processors, cause the one or more processors to perform one or more methods or operations described herein. In at least one embodiment, the one or more processors and the memory are included in a mobile communication device. Yet other embodiments relate to systems, consumer devices, computer program products, systems, and machine-readable storage media, which can employ or store instructions to cause methods and operations described herein to be performed.

In at least one embodiment, a method includes accessing, by a client device, from a first computer system, a first electronic document identified by a uniform resource indicator (URI). The method further includes generating, by the client device, a first set of hashed data portions corresponding to the first electronic document, where each of the first set of hashed data portions corresponds to a different portion of data in the first electronic document. The method further includes sending, by the client device, to a second computer system, a request for one or more hashed data portions corresponding to the first electronic document, the request including information identifying the first electronic document. The method further includes receiving, by the client device, from the second computer system, a second set of hashed data portions responsive to the request, where each of the second set of hashed data portions are generated based on a different portion of data in a second electronic document, and where the second set of hashed data portions are identified as responsive to the request based on determining that the second electronic document matches the first electronic identified by the information in the request. The method further includes comparing the first set of hashed data portions to the second set of hashed data portions. The method further includes identifying, based on the comparing, one or more data portions of the first electronic document that are different from the second electronic document. The method further includes sending, to the computer system, the one or more identified data portions of the first electronic document as updates to the second electronic document, where the second computer system associates the one or more identified data portions as updates to the second electronic document. In at least embodiment, the first computer system is a web server computer and is different from the second computer system.

In at least one embodiment, the first set of hashed data portions includes a first hashed data portion generated using a weak hash function and includes a second hashed data portion generated using a strong hash function. The first hashed data portion and the second hashed data portion may be generated based on a same portion of the data in the first electronic document. The weak hash function may be defined by a first threshold measure of collisions and the strong hash function may be defined a second threshold measure of collisions, where the first threshold measure of collisions may be greater than the second threshold measure of collisions.

In at least one embodiment, the second set of hashed data portions includes a first hashed data portion generated using a weak hash function and includes a second hashed data portion generated using a strong hash function. The first hashed data portion and the second hashed data portion may be generated for a same portion of the data in the first electronic document. The weak hash function may be defined by a first threshold measure of collisions and the strong hash function may be defined a second threshold measure of collisions. The first threshold measure of collisions may be greater than the second threshold measure of collisions.

In at least one embodiment, each of a subset of the first set of hashed data portions and each of a subset of the second set of hashed data portions are generated by a sliding window technique using a weak hash function.

In at least one embodiment, the first set of hashed data portions includes a weak hashed data portion and a strong hashed data portion for each of a plurality of data portions in the first electronic document, where the second set of hashed data portions includes a weak hashed data portion and a strong hashed data portion for each of a plurality of data portions in the second electronic document.

In at least one embodiment, comparing the first set of hashed data portions to the second set of hashed data portions includes: comparing the weak hashed data portion for each of the plurality of data portions in the first electronic document to the weak hashed data portion for each of the plurality of data portions in the second electronic document; identifying, based on comparing the weak hashed data for each of the plurality of data portions in the first electronic document, a first set of data portions in the first electronic document, each of the first set of data portions for which the weak hashed data portion matches a different weak hashed data portion in the second set of hashed data portions for a second set of data portions in the second electronic document; and comparing the strong hashed data portion corresponding to each of the first set of data portions to the strong hashed data portion of a data portion in the second set of data portions having the weak hashed data portion which matched the weak hashed data portion of the data portion in the first set of data portions. In some embodiments, the identifying, based on the comparing, one or more data portions of the first electronic document that are different from the second electronic document includes: based on determining that the weak hashed data portion of a first data portion in the plurality of data portions in the first electronic document does not match any weak hashed data portion in the second set of hashed data portions, identifying the first data portion for inclusion in the one or more data portions of the first electronic document that are different from the second electronic document; and identifying a second data portion of the plurality of data portions in the first electronic document for inclusion in the one or more data portions of the first electronic document that are different from the second electronic document, where the second data portions is identified based on determining that the strong hashed data portion for the second data portion does not match the strong hashed data portion of the data portion in the second set of data portions.

In at least one embodiment, the method further includes identifying one or more hashed data portions of the first set of hashed data portions that match any of the second set of hashed data portions, where the one or more identified data portions are sent to the second computer system along with the identified one or more hashed data portions. In at least one embodiment, the one or more identified data portions are sent to the second computer system along with information indicating a process to generate the first electronic document using the one or more identified data portions and the one or more identified hashed data portions.

In at least one embodiment, the method further includes: parsing the first electronic document to identify a plurality of data portions of the data in the first electronic document; and generating, a set of hash values for the plurality of data portions, where the set of hash values is generated based on applying one or more hashing algorithms to the plurality of data portions, and where the information identifying the first electronic document includes the generated set of hash values. In at least one embodiment, the first set of hashed data portions are generated based on the plurality of data portions, and each of the first set of hashed data portions corresponds to a different one of the plurality of data portions. In at least one embodiment, determining that the second electronic document matches the first electronic document includes determining that the generated set of hash values matches a threshold number of hash values in a set of hash values generated for the second electronic document, where each of the set of hash values is generated for a different one of a set of data portions of the data in the second electronic document. In at least one embodiment, the plurality of data portions are identified in the first electronic document by parsing the first electronic document based on a size of the first electronic document.

In at least one embodiment, the second set of hashed data portions is generated for a set of data portions in the second electronic document, where each of the set of data portions satisfies a threshold frequency for appearing in the second electronic document.

In at least one embodiment, the second set of hashed data portions is generated for a set of data portions in the second electronic document, and where each of the set of data portions satisfies a threshold frequency for appearing electronic documents related to the first electronic document identified by the URI.

In at least one embodiment, accessing the first electronic document from the first computer system includes: sending, to the first computer system, a hypertext transfer protocol (HTTP) request for the first electronic document, where the HTTP request includes the URI; and receiving an HTTP response, where the HTTP response includes the first electronic document identified by the URI, where the HTTP response includes one of a hypertext markup language (HTML) document or a document including JavaScript.

In at least one embodiment a method includes determining, by a computer system, identification data for a first electronic document stored in association with a uniform resource indicator (URI). The method further includes identifying, by the computer system, a set of data portions in the first electronic document, where each of the set of data portions satisfies a threshold frequency for appearing in the first electronic document. The method further includes generating, by the computer system, a set of hashed data portions for the identified set of data portions in the first electronic document, where each of the set of hashed data portions are generated based on a different portion of the identified set of data portions. The method further includes receiving, by the computer system, from a client device, a request for one or more hashed data portions corresponding to a second electronic document, the request including information identifying the second electronic document. The method further includes determining that the second electronic document matches the first electronic document based on the information identifying the second electronic document matching the identification data for the first electronic document. The method further includes responsive to determining that the second electronic document matches the first electronic document, sending the set of hashed data portions to the client device. The method further includes receiving, by the computer system, from the client device, one or more data portions of the second electronic document that are different from the first electronic document, where the one or more data portions are identified using the set of hashed data portions sent to the client device. The method further includes constructing, by the computer system, a third electronic document based on the one or more data portions of the second electronic document and the identified set of data portions, where the third electronic document is constructed as an update to the first electronic document having as at least a portion of the first electronic document and the one or more data portions of the second electronic document that are received from the client device. In at least one embodiment, the third electronic document is the first electronic document.

A better understanding of the nature and advantages of embodiments of the present disclosure may be gained with reference to the following detailed description and the accompanying drawings.

BRIEF DESCRIPTION OF THE DRAWINGS

In the following detailed description of embodiments of the present disclosure, reference is made to the accompanying drawings which form a part hereof, and in which is shown by way of illustration specific embodiments in which the present disclosure may be practiced. These embodiments are described in sufficient detail to enable those skilled in the art to practice techniques of the present disclosure, and it is to be understood that other embodiments may be utilized and that logical, mechanical, electrical and other changes may be made without departing from the scope of the present disclosure.

FIG. 5A illustrates a document, according to some embodiments.

FIGS. 5B and 5C illustrate the fingerprints generated for the most likely to appear content of the requested document (along with the corresponding most likely to appear content), according to embodiments.

FIG. 5D illustrates the client representation of a requested document using the fingerprints illustrated in FIGS. 5B and 5C.

DETAILED DESCRIPTION

Methods and systems for compact data storage of client-side modifications to a document (e.g. a web document) are described. Embodiments are directed to sending, from a client device to a web server, modified sections of the document using delta encoding. In various embodiments, the client compares client-generated fingerprints for the document with capture server-generated fingerprints for most likely appearing portions of the document or related documents to fully represent and send to the capture server the client document in a compact and efficient way. Specifically, embodiments pick the most statistically likely to appear content, i.e. content such as text chunks that clients have returned most often. In some cases, the capture-server could base the decision off of, for example, the language in the request headers. So for English language users, embodiments return one set of fingerprints for chunks, and for Italian language users, embodiments return a different set. It is also possible to return, for example, the 5 most likely to appear first blocks if, for example, there are 5 18-20% blocks most likely to appear. Embodiments can return one set of fingerprints for the first block if there is a 90%+ block most likely to appear.

Embodiments can further provide the selection process for the most likely occurring text portions process, using various selection processes in order to choose the best fit text to compare with and represent each document with the least amount of information. Traditional compression techniques may also be used after the described embodiments to further decrease the communicated data between client and server.

I. High-Level Architecture of Capture System

Figure 1:
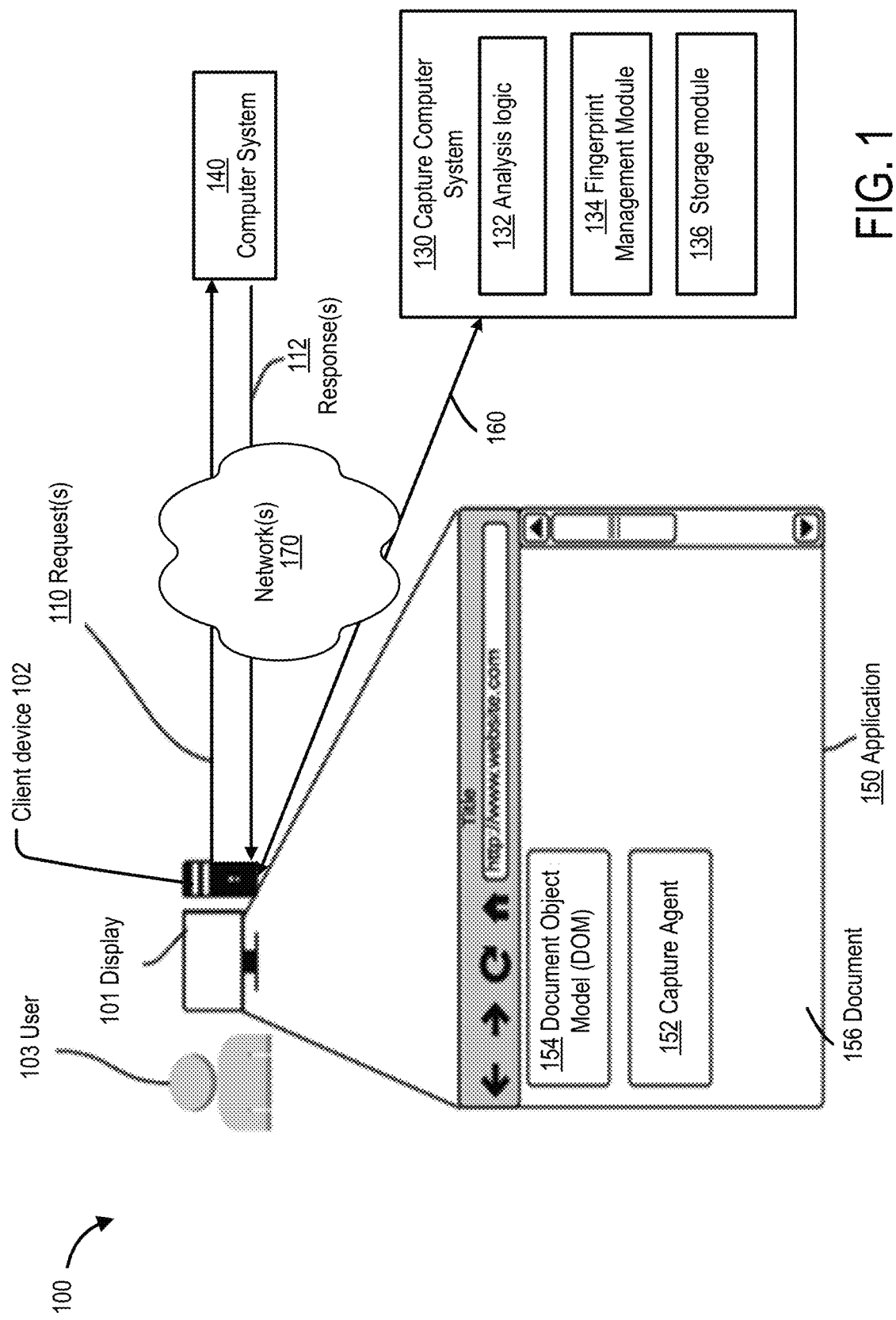
FIG. 1 illustrates the architectural components according to one embodiment of the inventive subject matter.

FIG. 1 illustrates a generalized example of a system 100 as a high level architectural diagram for a document capture system. One or more of the below-described techniques may be implemented in or involve one or more computer systems. System 100 is not intended to suggest any limitation as to scope of use or functionality of described embodiments.

The system 100 may include one or more "clients" or client systems (e.g., client application or client device), such as a client device 102. System 100 may include a computer system 140 (e.g., a web server computer). Clients may be operated by users, such as user 103. Computer system 140 may be operated by a user (e.g., an administrator). Clients can communicate with computer system 140 to exchange data via one or more communication networks (e.g., a network 170). Examples of a communication network include, without restriction, the Internet, a wide area network (WAN), a local arear network (LAN), an Ethernet network, a public or private network, a wired network, a wireless network, and the like, and combinations thereof.

Communications between clients and computer system 140 may include one or more requests 110 and/or one or more responses 112. A communication session (e.g., a web session) may be established between client device 102 and computer system 140 to exchange communications via network 170. Computer system 140 may be implemented to store electronic documents, such as a collection of web documents for a website. In some embodiments, clients may communicate with computer system 140 by transmitting a request 110 along network 170 to computer system 140. For example, a request from client device 102 to computer system 140 may be a request for a web page accessed from a URL at client device 102. A response 105 from a computer system 140 to client device 102 may be a response providing the web page requested by client device 102. The communications exchanged in system 100 may be transmitted via one or more data packets. Data packet(s) that are received may be reassembled to yield a communication, such as a request or a response. Requests and responses may be transmitted via one or more network devices.

Requests and responses may include data, such as consumer data and/or enterprise data. The data may include electronic documents (also referred to herein as "documents"). Data may be received from a computer system, data may be sent to a computer system, data may be processed by a computer system, or combinations thereof. Enterprise data may be distinguishable from consumer data for consumer applications and/or services. In certain embodiments, enterprise data may include data processed, stored, used, or communicated by an application or a service executing in an enterprise computer system. For example, data in a communication may include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data"), system data, configuration data, synchronization data, or combinations thereof. In some embodiments, data in communications 110, 112 may include a resource such as a document as referenced herein. A resource, such as a document, may include a document extended markup language (XML) files, HTML files (e.g., a web page), JavaScript files, visual assets, configuration files, media assets, a content item, etc., or a combination thereof. For example, a resource may be a web page in an HTML format referenced by uniform resource information (URI), e.g., a uniform resource locator (URL). A BLOB may include a collection of binary data stored as a single entity in a database management system, such as an image, multimedia object, or executable code, or as otherwise known in the art.

System 100 can include a capture computer system 130 (also referred to herein as a "capture system" or "capture computer system") that performs techniques disclosed herein for providing compact data capture and storage of resources, such as documents. Computer system 130 may provide a service or an application that enables a user to perform efficient capture and storage of resources, such as documents in system 100. Computer system 130 may be implemented as part of client device 102, computer system 140, or a combination thereof. Computer system 130 may be communicatively coupled (e.g., via a network 170) to one or more elements in system 100. For example, computer system 130 may be communicatively coupled to client device 102 via connection 160 through network 170. Computer system 130 can be communicatively coupled to computer system 140 via network 170.

Computer system 130 and client device 102 may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Computer system 130 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. Computer system 130 may be implemented using hardware, firmware, software, or combinations thereof. In one example, computer system 130 may include or implement a service or a product (e.g., a computer program product) provided by Quantum Metric, LLC. In various embodiments, computer system 130 may be configured to run one or more services or software applications described in the foregoing disclosure. For example, computer system 130 may perform processing as disclosed herein according to an embodiment of the present disclosure.

Client device 102 may include or be coupled to a display 101. Client device 102 may provide access to one or more applications, such as application 150. Application 150 may be a browser enabling user 103 to view resources, such as documents. In at least one embodiment, system 100 may include an agent 152 ("capture agent") that can capture data communicated in system 100. Capture agent 152 may be an application that resides on client device 102, computer system 130, computer system 140, or a combination thereof. For example, capture agent 152 may be implemented using JavaScript that is embedded in a document (e.g., web page 156) of a web site that can identify and obtain data that is displayed at client device 102. Capture agent 152 may be client-side such that it is implemented at client device 102. Capture agent 152 can be sent in communications to client device 102. Capture agent 152 may communicate with computer system 130 to store data that is captured. Capture agent 152 may perform operations disclosed herein as being performed by a client. In some embodiments, capture agent 152 may be received from computer system 130. Capture agent 152 may be deployed to client device 102 as part of a service provided by computer system 130.

In some embodiments, computer system 130 and client device 102 may be implemented using a computing system comprising one or more computers and/or servers that may include those described above. The computing system may be implemented as a cloud computing system. Computer system 130 and client device 102 may include several subsystems and/or modules, including some, which may not be shown. Computer system 130 may have more or fewer subsystems and/or modules than shown in the figure, may combine two or more subsystems and/or modules, or may have a different configuration or arrangement of subsystems and/or modules. For example, computer system 130 may include analysis logic 132, fingerprint management module 134, and storage module 136. Subsystems and modules of computer system 130 may be implemented in software (e.g., program code, instructions executable by a processor), in firmware, in hardware, or combinations thereof. The subsystems and/or modules of computer system 130 may be implemented to perform techniques disclosed herein. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein. Computer system 130 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Computer system 130 and client device 102 may provide other services and/or software applications in a virtual or non-virtual computing environment. For example, computer system 130 may be configured to run one or more of these services or software applications described in the foregoing disclosure. Such services may be offered on-demand to users of client device 102. In some embodiments, a specific instantiation of a service provided by computer system 130 may be referred to herein as a "service." Users operating client device 102 may use one or more applications to interact to utilize the services or applications provided by computer system 130. Services may be offered as a self-service or a subscription. Users can acquire the application services without the need for customers to purchase separate licenses and support. Examples of services may include a service provided under a Software as a Service (SaaS) model, a web-based service, a cloud-based service, or some other service provided to client device 102 via network 170. A service made available to a user via network 170 (e.g., a communication network) from computer system 130 is referred to as a "cloud service." In some embodiments, computer system 130 may host an application, and a user may, via network 170, access the application at client device 102 on demand. Users operating client device 102 may in turn utilize one or more applications to interact with computer system 130 to utilize the services provided by subsystems and/or modules of computer system 130.

In some examples, a service may be an application service may be provided computer system 130 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in computer system 130, which may be implemented as a cloud computing system. The cloud computing system may be implemented as a cloud-based infrastructure that is accessible via network 170. Various different SaaS services may be provided.

Computer system 130 and client device 102 may each also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, computer system 130 may be coupled to or may include one or more data stores. The data store(s) may store templates, edit scripts, and other information for the operations disclosed herein. The data store(s) may be implemented to store data using one or more data structures (e.g., a hash table). The data store(s) may be accessible to perform search and retrieval of data stored in the data store(s). It may also include analysis logic to select a template for responses as well as logic to store the edit scripts with respect to the template, as exampled and described in some embodiments below. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

In at least one embodiment, a web session may begin with a user 103 on a web browser 150 initiating the browser request 110 for a web document 156 from computer system 140. The user 103 may initiate the browser request 110 on a client device 102.

Once the computer system 140 has received the request, it may transmit a response 112 and return to the client device's 102 web browser 150. The response 112 of the computer system 140 may include the web document 156 requested by the user 103. The computer system 140 may further include within the response 112 a Document Object Model (DOM) 154, such as an HTML DOM. The document may be rendered according to the DOM. In one embodiment, the web document 156 may contain a reference to the capture agent 152 (e.g., JavaScript code), which can then be fetched as a result from computer system 130. The capture agent 152 could also be sent separately from the web document 156. Regardless, the capture agent 152 would be sent in conjunction with the web document 156, such that the capture agent 152 can capture data about the web document 156. For example, the computer system 130 may store a copy of the client's request 110 and the response 112 including any modifications made in route or by the client, which may include the entire DOM 154, at the storage module 136. Using the analysis logic 132, computer system 130 may select portions of text most likely to appear in the web document 156 sent in the response 112, such as using a best matched document for the web document 156. Computer system 130 may generate fingerprints or hashes for the most likely appearing portions of text, which may be based on a best match document or other analysis techniques, and send the fingerprints to the client device 102. Using the fingerprints for the most likely appearing portions of text, the client device 102 may identify portions of the web document 156 as displayed on the client web browser 150 that match those received from computer system 130. As the capture agent 152 may identify the matches, the capture agent 152 can also identify those portions of text that do not match, and will send fingerprints for the matching portions and send the text of the corresponding non-matching portions to computer system 130. Computer system 130 may then use the mixture of fingerprints and non-matching text portions to reassemble the exact web document rendered in the client browser 150. Example embodiments of the embedded client-side capture agent 152 and computer system 130 identifying changes to the DOM 154 are further detailed below.

Now turning to FIGS. 2-5, examples of compact data storage of modifications to a document (e.g. an electronic document) are described according to some embodiments. These examples are described with reference to system 100 of FIG. 1. Examples disclosed herein may be described as a process, which may be depicted as a flowchart, a flow diagram, a data flow diagram, a structure diagram, a sequence diagram, or a block diagram. Although such diagrams may describe operations as a sequential process, all or some of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function. Although some techniques may be described as being performed at one element of system 100, such as at a client 102 or computer system 130, the techniques may be performed in a variety of different combinations. For example, some or all of the features of computer system 130 may be implemented at a client device 102, or vice versa.

The processes disclosed herein, such as those described with reference to FIGS. 2-5, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by one or more computer systems depicted in FIG. 1. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. While processing depicted in FIGS. 2-5 may be described with respect to a single communication, such processing may be performed for multiple communications. Furthermore, additional steps may be added or removed depending on the particular applications. One of ordinary skill in the art would recognize many variations, modifications, and alternatives.

In an aspect of some embodiments, each process in FIGS. 2-5 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

II. Capture System Fingerprints Selection

According to various embodiments, a capture system (e.g., capture computer system 130) disclosed herein can identify content (e.g., text) most likely to appear in an electronic document. A document may be accessed from a computer system, e.g., computer system 140. For example, a document may be stored at the computer system as part of documents stored for a website. The document may be accessed using URI, such as a URL. Documents may be provided to capture system by computer system 140 (e.g., a web server computer) and/or by a client, e.g., client device 102. In some embodiments, documents may be stored in local storage by computer system 140. The capture system may access the documents from the local storage.

A capture system may perform processing on a document to determine content (e.g., text) most likely to appear in the document. The content most likely to appear in a document may be the content for which the capture system generates hashed data (e.g., a fingerprint), using techniques disclosed herein. The fingerprint(s) may be used to identify a document accessed by a client and whether such a document has changed. For example, fingerprints may be compared to content in a document to determine content in the document that has changed or is different. The fingerprints used for comparison of a document may be identified upon identifying the document as a matching document for which fingerprints are generated.

Content may be identified as most likely to appear in a document based on satisfying one or more criteria (e.g., a threshold frequency) for appearing in the document. In some embodiments, the capture system may identify content most likely to appear in a document based on information about a document. The capture system may be requested to provide fingerprints for a document. The information about the document may be used to identify content likely to appear in the document. The content likely to appear in the document may be processed by the capture system to generate a fingerprint(s) for the content. In some embodiments, content most likely to appear for a document may be classified for a set of documents, such as documents defining a website. The content most likely to appear may be identified for the entire website instead of a specific document. In some embodiments, the capture system may store content most likely to appear for a specific document and for a set of documents (e.g., documents defining a website) including the specific document. Some of the content may be similar across the set of documents.

The capture system may store content most likely to appear in a document in association with information about the document. The information about the document may include a URI, a document's originating site address, a client IP address, client language, and other indicators about the document. Based on a request for fingerprints for a document, content may be identified according to information about the document in the request. For example, a request sent by the client may include various indicators as to URI, document's originating site address, client IP address, client language, and other indicators, any of which may be used to identify the most likely to appear content in the document.

In some embodiments, content most likely to appear in a document may be stored in association with a signature of the document. In doing so, the capture system may achieve greater storage efficiency by avoiding storage of a document, and instead storing the signature of the document. A signature of a document may include one or more values generated based on data in the document. The value(s) may be generated using one or more hash (also referred to herein as "hashing") functions. A hash function may be implemented using a hashing (also referred to herein as a "hash") algorithm. The signature of a document may be used to identify the content most likely to appear for a document identified based on a signature included in a request from a client. The signature of the document may be generated using techniques disclosed herein. The capture system may store documents for an entire website by storing a signature for each different document accessible for the web site.

Based on identifying a document matching a document identified in a request from a client, the capture system may send one or more fingerprints for the document. The capture system may send, to a client, a specific set of fingerprints for each unique document while also sending a separate set of fingerprints for an entire website. The fingerprints may be generated for the content most likely to appear for the document, and/or a set of documents, whichever way defined. In doing so, the client can cache the site-wide fingerprints to achieve greater efficiency. The capture system may send fingerprints for a document to a client at any time. By sending fingerprints for content most likely to appear, a client can locally cache the fingerprints in advance of a request for a document. In doing so, a client can reduce processing time for determining whether a document matches based on fingerprints being stored locally. To achieve efficient communication between a client and the capture system, a limited, or selected amount of fingerprints can be sent from the capture system.

Figure 2:
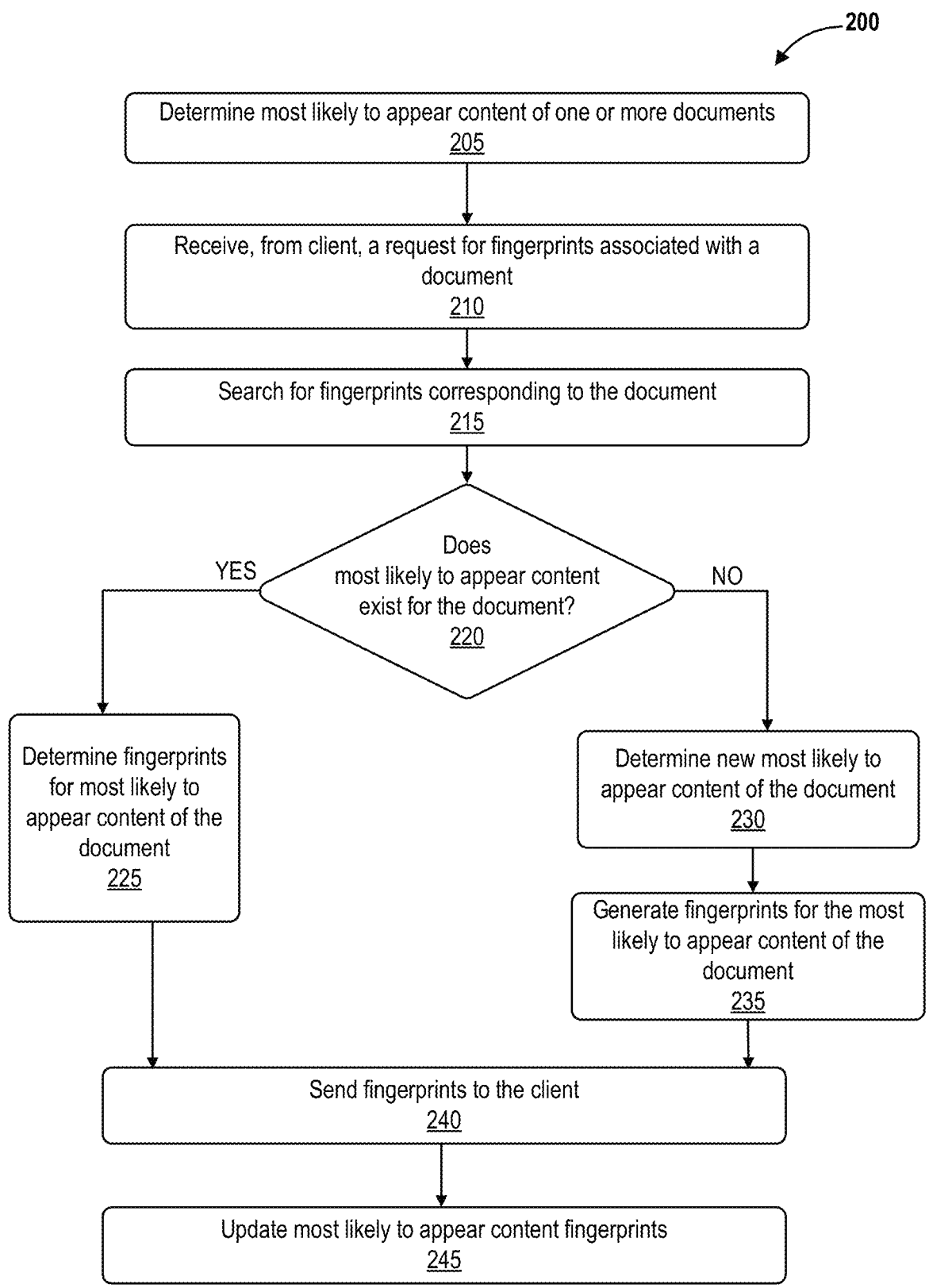
FIG. 2 illustrates a workflow of a process for the identification of the most likely to appear content according to some embodiments.

In some embodiments, the capture system may perform processing to determine content most likely to appear in one or more document through statistical analysis. The capture system may determine content most likely to appear for one or more documents based on appearance frequency which is known to one skilled in the art. The appearance frequency may be determined based on analysis of content in the document(s). The capture system may determine content most likely to appear based on one or more criteria (e.g., frequency) having a threshold for appearing in the document(s). The capture system may determine that a specific block of content is 90% most likely to be displayed for a specific document. In this case, the capture system can generate and store fingerprints for the 90% most likely to appear content. Another example would be that, through the same statistical analysis, the capture system may determine there are a top number of content blocks that are likely to appear a threshold frequency of time. In yet another example, the capture system may determine that based on two previous documents viewed at a client, a third document is likely to contain a specific block of content based on previous captures analyzed where clients had viewed the same two previous documents. In this case, the capture system may choose to send this expected block of a fingerprint based on the patterns identified by the client's history. FIG. 2 illustrates workflow 200 of a process for the identification of the most likely to appear content according to some embodiments.

The capture system may implement a fingerprint selection process described below with respect to FIG. 2 for choosing the most likely to appear content for a document. A document may be identified based on information sent from a client. The information may include a signature of the document, or other information identifying the document such as a uniform resource indicator (URI), language, other common header information such as OS/browser/location, or through keeping track of the users session and previous URI's the client has visited. A signature of a document may be generated using techniques described with reference to FIG. 4. The capture system may compare the information identifying a document, such as a signature of the document, to find a document matching the information. For example, capture system may compare a signature of a document received from a client to signatures of different documents stored by computer system 130. A document may be identified as matching based on a signature matching according to a threshold value. As disclosed below, a signature may be comprised of multiple data portions, each of which is hashed based on a data portion in the document.

The capture system may identify fingerprints for a document identified as matching a document identified by a request from a client. The fingerprints may be used by client to identify differences between a document associated with the fingerprints stored by the capture system and a document at the client matching the document stored by the capture system. The differences may be sent from the client to the capture system. The differences may be stored in association with the document at the capture system. The capture system can reassemble the document based on its signature and add the differences to recreate the document accessed at the client. Such a technique can be used to determine a document viewed by a user at the client without having to store the entire document at the capture system and without the client having to communicate the entire document to the capture system.

FIG. 2 illustrates a workflow 200 for managing fingerprints for a document according to some embodiments. In some embodiments, workflow 200 may be implemented by computer system 130 of FIG. 1. Workflow 200 may be implemented to provide a client with fingerprints of the most likely to appear content for a document accessed at the client. The client may use the fingerprints to determine whether any portion of the document is different from a version of the document previously stored by a capture system. Some embodiments make use of the general condition of the web server applications serving very similar responses based on a specific URL. Identifying the correct most likely to appear content is important in achieving compression.

Workflow 200 may begin at step 205, most likely to appear content is determined for one or more documents. The document(s) may be part of a website. The most likely to appear content may be determined according to techniques disclosed herein such as those described above. In some embodiments, the most likely to appear content may be determined for a website, including documents individually. The identified content may be stored in association with the documents themselves. The content identified in a document may include one or more data portions. Each of the data portions may be identified as content most likely to appear in the document. Content most likely to appear in the document may be identified as satisfying one or more criteria (e.g., a threshold frequency) for appearing in the document.

The documents may be stored by the capture system in association with information identifying those documents. To conserve storage, the documents may be accessible at a different computer system (e.g., a web server that hosts the documents) and instead the capture system may store information identifying those documents. The information identifying the document may include a URI identifying a location of the document, other information about the document, a signature of the document, or a combination thereof. Workflow 200 may include determining identification data for a document. The document may be processed to determine the identification data. For example, a signature of the document may be determined using techniques such as those described with reference to FIG. 4.

At step 210, a request may be received for fingerprint(s) associated with a document. The request may be received from a client. The request may include information identifying a document. The information identifying a document may be determined by the client in a manner similarly described above at step 205. The information may include a URI of the document and a signature of the document. Instead of sending the entire document to the capture system, a client may request the fingerprints, so that it can determine whether content of the document has changed. Such techniques minimize communication resources, e.g., communication bandwidth, by limiting an amount of data communicated between the device and the capture system. The techniques further reduce the processing performed and the power consumed by the client to communicate data, since fingerprints, not an entire document, are communicated.

At step 215, a search is conducted for fingerprints corresponding to the document, if any. In one embodiment, the capture system looks for a matching selection of fingerprints based on information identifying the document (e.g., the URL or elements of the URL). For example, if a client performs a request and a server supplies a response for "index.html" of a website, the capture system uses the full URL "index.html" to look for an existing "index.html" document incorporating the most likely to appear content. If the request is for "controller.jsp?action=view_account&location=CO", the server may use the portion "action=view_account" for the lookup for most likely to appear content, as the parameter value "view_account" will be most useful in the unique identification of similar responses. Similarly, one embodiment may use other fields provided in the request, such as site's host name, POST data, or client language, instead of solely the URL. In some embodiments, the capture system may search information associated with documents to find a document that matches the document identified by the request at step 210. For example, the capture system may search documents to identify one that has a signature matching the signature of the document identified in the request.

At step 220, a decision is made whether any content exists for the document. The document may be compared to documents ("known documents") previously recognized, or known, by the capture system. The known documents may be identified has having content that is most likely to appear for those documents. Therefore, content exists for a document if the document matches a known document for which content has been identified as most likely to appear. As such, known documents may be searched to determine whether any match the document for which a request is received at step 210. Fingerprints may have been generated for a document if the document is identified as having content likely to appear for the document. A fingerprint may be generated for each distinct data portion of the document identified as content.

To determine whether content exists, the document identified by the request at step 210 is compared to known documents to determine whether if any of the known documents are similar to the document identified by the request. Documents may be compared using techniques described with reference to FIG. 4. A document may match a known document if a threshold for similarity is satisfied based on the comparison of the documents. The information identifying the documents may be compared to determine whether a known document matches the document. For example, a signature of the document may be compared to a signature of each of the known documents to determine which, if any, of the know documents matches the document.

Upon identifying one or more known documents that match, workflow 200 may include determining whether the matching known documents are associated with any content that is likely to appear on those documents. Upon determining that content exists which is identified as being most likely to appear for a document, workflow 200 proceeds to step 225. Upon determining that content does not exist which is most likely to appear for the document, workflow 200 may proceed to step 230. The capture system may send a response to the request for fingerprints, indicating that no document matching the document in the request was found.

At step 225, fingerprint(s) are determined for the content most likely to appear in a document. The fingerprints may be generated using techniques disclosed herein, such as those described with reference to FIG. 3. The fingerprints may have been previously generated or may be generated upon determining that a document matches the known document matched as having content most likely to appear in the known document. If fingerprints were previously generated for a known document, then those fingerprints may be stored in association with the known document. The fingerprints can be retrieved based on information identifying the known document that matches the document requested at step 210.

At step 240, the fingerprints determined for the content of the known document are sent to the client from which the request is received at step 210.

Returning to step 230, which may be performed based on the decision at step 220, new content most likely to appear in the document is determined. The document is the one for which a request is received at step 210. The information identifying the document may be processed to determine whether any content in the document is most likely to appear. The most likely to appear content may be identified using techniques disclosed herein. The document may be stored by the capture system as a new known document. The document may be stored in association with the content identified as most likely to appear for the document.

At step 235, one or more fingerprints are generated for the document. Fingerprints may be generated using techniques disclosed herein. Workflow 200 may proceed to step 240, where the generated fingerprints may be sent to the client from which a request was received at step 210.

At step 240, fingerprints may be sent one in one or more responses to the client. The fingerprints may be sent with information identifying the document for which the fingerprints were generated. The client can use the fingerprints to determine whether any new content has been added to the document or whether the content has changed.

Figure 3:
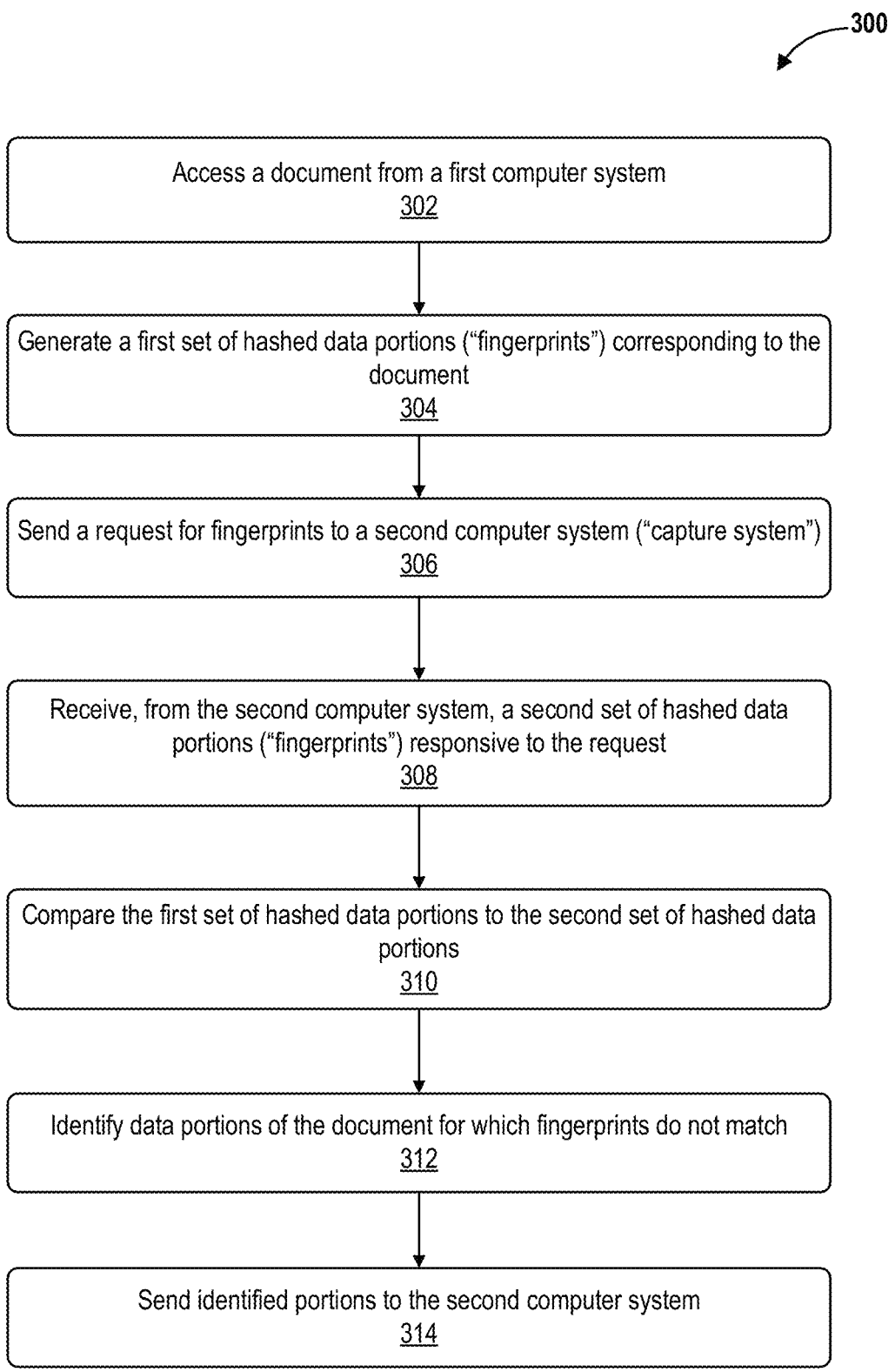
FIG. 3 illustrates a workflow of a process by which a client can determine the changed data portions of the document according to some embodiments.

In response to receiving the fingerprints, the client may perform operations, such as those described with reference to FIG. 3. The client may generate its own fingerprints for the document which was identified in the request at step 210. The generated fingerprints may be compared to the fingerprints received at step 240. The fingerprints that do not match may be identified. The client may identify data portions of the document (as displayed in the client's browser) that are different from the most likely to appear content for which fingerprints were received from the capture system. The data portions of the document corresponding to the fingerprints that do not match may be identified as the content which is new or modified from the known document. As such, the client may send, to the capture system, the data portions of the document for which the fingerprints do not match.

At step 245, fingerprints sent from the client are received. The data portions corresponding to the fingerprints that do not match are stored in association with the known document for which fingerprints were stored. The data portions may be stored as updates to the known document. The data portions may be processed to determine whether any of those data portions should be identified as being likely to appear for the known document. The fingerprints for those data portions may be stored with the data portions as updates. In some embodiments, the capture system may generate a new set of fingerprints for the known document including the updated data portions. Workflow 200 may end at step 245.

In some embodiments, for optimal compression, the fingerprints sent to the client can be regenerated or updated as the statistical frequency of data portions appearing in the documents sent back from the clients change. By keeping the fingerprints the most up to date, and the most matching, the amount of data sent between the client and the capture system may be reduced. To keep the fingerprints up to date, the client may request the fingerprints directly from the capture system or the client may interact with a data distribution network (DDN), and the capture server may periodically update the file that is hosted on a content distribution network (CDN). In some embodiments, there can be more than one file with fingerprints, for example one specific to the requested URL and another set of fingerprints that likely appear across an entire site of related documents.

III. Fingerprint Generation of the Most Likely to Appear Content in a Document

The capture system may generate fingerprints for the content most likely to appear in a document. The techniques for generating fingerprints may be implemented at clients and the capture system. Content most likely to appear in a document may be identified as data portions. A fingerprint may be data generated based on the data portion of content. For example, a fingerprint may be generated by performing a hash function on a data portion of content. The fingerprints may identify portions of a document (e.g. a web page). As used herein, generating hashes for the most likely to appear content and/or a document may require an even distribution of hashes across the document. As used herein, generating fingerprints for the most likely to appear content may not require an even distribution of the fingerprints across the document. Accordingly, generating hashes for the document may satisfy the requirements for generating fingerprints for the document.

According to various embodiments, a document may be divided into data portions, each corresponding to different content most likely to appear. Each of the data portions may be processed to generate a hashed data portion. In some embodiments, the data portions may be of equal size. Yet in other embodiments, the data portions may be of different sizes. Data portions may be identified in a document by parsing the document based on the size of the document. A document may be parsed to divide the most likely to appear content based on content (or context) instead of size. For example, the most likely to appear content may be divided after 10 sentences instead of a set number of bytes. Yet in another example, the most likely to appear content may be divided into data portions based on tags in the HTML. Dividing a document contextually may allow to better capture the changes in the most likely to appear content as people tend to change a format (e.g., HTML) within the confines of a sentence, a block or a tag.

Based on the data portions identified in a document, fingerprints may be generated according to various techniques. In some embodiments, both strong fingerprints and weak fingerprints may be generated for each of the data portions. The data portions may correspond to the most likely to appear content in the document. Fingerprints may be generated for each different data portion. A fingerprint may be generated for a data portion by performing a hash function on the data portion. The hash function may be a weak hash function to generate a weak fingerprint. A weak hash function may be implemented using one or more weak hashing algorithms. The hash function may be a strong hash function to generate a strong fingerprint. A strong hash function may be implemented using one or more strong hashing algorithms. As disclosed herein, a weak hash function may be prone to a higher frequency of collisions in comparison to a strong hash function. However, a weak hash function may be performed faster that a strong hash function. A weak hash function may consume less computing resources than a strong hash function. As such, a weak hash function may be desirable to implement on a computing device having limited resources, such as a mobile device. After implementing techniques disclosed herein using a weak hash function, a strong hash function may be implemented for those fingerprints that match using a weak hash function. A weak hash function may be implemented using a threshold number of bits that is less than a threshold number of bits to implement a strong hash function. In some embodiments, a weak hash function may be implemented using a weak hashing algorithm defined by a 32 bits. For example, a weak hash function may be implemented such that it generates data having a length of 32 bits. In some embodiments, a strong hash function may be implemented using a strong hashing algorithm defined by 128 bits. For example, a strong hash function may be implemented such that it generates data having a length of 128 bits. The algorithms disclosed herein may be implemented by a person of ordinary skill in the art.

A hash function may be associated with one or more attributes, such as collision attribute. A collision attribute may include collision resistance. For example, collision resistance is an attribute that indicates a threshold measure of collisions that occur, or are permitted, for the hash function, such that the threshold is not satisfied (e.g., exceeded). A weak hash function may be defined by a threshold measure of collisions that is different (e.g., greater) than a threshold measure of collisions defined by a strong hash function.

According to various embodiments, the weak fingerprints may be faster to generate (e.g. using less resources) than the strong fingerprints. The fingerprints may include weak fingerprints and strong fingerprints. Weak fingerprints may be quickly calculated using a rolling, or cumulative, system, thereby minimizing computing resources to determine fingerprints. However, using a weak hash function to generate weak fingerprinting may be prone to collisions (e.g. it is non-uniquely identifying). A weak hash function may be prone to a higher frequency of collisions than a strong hash function. The rolling system may entail transforming a known fingerprint of a sequence (e.g. ABCDE), to the fingerprint of an adjacent byte sequence (e.g. BCDEF) with a sequence of computational operations. Strong fingerprints may be highly resistant to collisions such that there would be no two same fingerprints representing different portions of data across all most likely to appear content. However, strong fingerprints may use more computing resources.

A client can also generate its own set of fingerprints for a document. The capture system and the client may use the same algorithm to generate the fingerprints. Accordingly, if the capture system and the client were given the same data, they would generate exactly the same fingerprint, both weak and strong.

A document may be divided into data portions that are identified as rolling data portions. A weak fingerprint may be generated for data portions in a document using a weak hash function. The weak fingerprint may be generated using a sliding window technique using a weak hash function known by one skilled in the art. Using the sliding window technique, data portions of a document may be identified to be hashed to generate hashed data portions representing a weak fingerprint. Rolling data portions may be identified as having overlapping data (e.g., an overlapping character) between adjacent data portions. For example, if the document consists of ABCDEF, then the data portions may consist of ABC, BCD, CDE, and DEF. Some embodiments may dynamically change the algorithm or parameters for the algorithm (e.g. size of the data portions) for dividing the document into data portions based on parameters received from the capture system. A weak fingerprint may be calculated for each of the data portions in the same way as the capture system. In another example, for a document comprising content of ABCDEF, a fingerprint for ABC may be transformed to a fingerprint for BCD based on the value of D. Repeating this process, the client may go through the document and generate a fingerprint for each data portion of the document for a sliding window of data. The sliding window of data may correspond to a particular factor (e.g., number of characters) by which to slide the window for generating fingerprints.

IV. Client-Side Document Capture

According to various embodiments, a client may identify portions of the document that has changed from what has been sent by the server. FIG. 3 illustrates a workflow 300 of a process by which a client can determine the changed data portions of the document according to some embodiments. The process may use fingerprints received from a capture system (e.g., computer system 130) and fingerprints generated by the client.

Workflow 300 may begin at step 302, a document (e.g., a first document) is accessed from a computer system (e.g., a first computer system). The computer system may be a web server computer that stores documents. The documents may be stored in association with a web site. Each of the documents may be identified by information, such as a URI indicating a location of the document. For example, accessing a document may include sending, to the computer system, a hypertext transfer protocol (HTTP) request for the document, where the HTTP request includes the URI, and receiving an HTTP response, where the HTTP response includes the first electronic document identified by the URI. The HTTP response may include one of a hypertext markup language (HTML) document or a document including JavaScript. A document received in a response may be referred to herein as a "response document."

At step 304, fingerprints may be generated for the document accessed at step 302. A client may parse the document to identify data portions. The data portions may be identified using techniques disclosed herein. The data portions may be identified in a manner which the capture system uses to identify data portions. For example, the data portions may be identified by parsing the document, using techniques disclosed with reference to FIG. 4.

The fingerprints may be a set of hashed data portions (e.g., a first set of hashed data portions) of the data portions identified in the document. One or more fingerprints may be generated for each data portion. For example, a weak fingerprint and a strong fingerprint may be generated for each data portion. A strong fingerprint may be generated using a strong hash function. A weak fingerprint may be generated using a weak hash function. The weak hash function may implement a rolling or a sliding window hashing technique. In some embodiments, a strong fingerprint may be generated based on matching the weak fingerprint to another weak fingerprint of a document. Because strong hash functions may depend on more computing resources, in some embodiments, weak fingerprints may be generated first before a strong fingerprint is generated. A strong fingerprint may be generated for a data portion having a weak fingerprint that matches a weak fingerprint of a document obtained from the capture system. Such a technique may minimize processing performance and minimize consumption of battery of a device by limiting strong fingerprint generation for only those data portions that match based on a weak fingerprint.

The hashed data portions generated may include a weak hashed data portion generated using a weak hash function and a strong hashed data portion generated using a strong hash function. The hashed data portions (e.g., a weak hashed data portion and a strong hashed data portion) may be generated for each data portion identified in a document. A weak hashed data portion and a strong hashed data portion may be generated based on a same data portion in a document.

In some embodiments, a document may be divided into data portions, such as rolling chunks. For example, if the document consists of ABCDEF, then the data portions may consist of ABC, BCD, CDE, and DEF. Embodiments may dynamically change the algorithm or parameters for the algorithm (e.g. size of the chunks) for dividing the document into data portions based on parameters received from the capture system. For example, the most likely to appear content may be divided contextually based on parameters received from the capture system. Fingerprints may be generated for the data portions in a manner similar to the capture system.

At step 306, a request may be sent to a computer system (e.g., a second computer system). The computer system may be the capture computer system 130 of FIG. 1. The request may be for one or more fingerprints (e.g., hashed data portions) corresponding to the document accessed at step 302. The request may include uniquely identifying information of the document to the capture system.

The document may be parsed into data portions. Using techniques described with reference to FIG. 4, a set of hash values, or a "signature," may be generated for the data portions. The set of hash values may be generated based on applying one or more hashing algorithms to the data portions. The set of hash values may be generated as information identifying the document. The request may be sent with the set of hash values. Other information such as the URI may be sent with the request.

In response to the request, the capture system may identify a document that matches the document identified by the document. Using techniques disclosed herein, the document may be identified by comparing the information about the document with information identifying documents known by the capture system. For example, the set of hash values may be compared for the document identified by the request with hash values generated for known documents accessible to the capture system. The known documents may be filtered based on information identifying the document in the request. For example, known documents may be filtered as being associated with a website identified by all or part of a URI. Determining that the document identified by the request matches a known document includes comparing a set of hash values generated for the documents. Documents may match when a threshold number of hash values are matched. The threshold number may be defined a similarity threshold.

A set of fingerprints may be generated for a matching document. The fingerprints may be previously generated or may be generated upon identifying the matching document. In some embodiments, the fingerprints may be generated for data portions in the matching document, where the data portions correspond to content most likely to appear in the document. That is, the fingerprints may be divided into sets keyed to specific uniform resource indicators (URIs), created with the most frequently occurring data portions of documents associated with the URI. Content may be most likely to appear by satisfying a threshold frequency for appearing in the document. In some embodiments, the threshold frequency may be defined for documents related to the document identified in the request, such as documents for a website. In some embodiments, fingerprints for documents and information identifying the documents may be sent to the client in advance of a request. The client may have previously received a predetermined list of fingerprints which may relate to all URIs or a single URI. That is, a single set of fingerprints may be created for the most frequently occurring data portions of documents across all URIs. The client may determine the fingerprints for a document based on a document matching the document accessed at step 302.

At step 308, a response may be received from the second computer system. The response may be responsive to the request at step 306. The response may include one or more fingerprints (e.g., hashed data portions) corresponding to the document identified by the request. In some embodiments, the response may not include fingerprints if a document does not match that identified in the request. In some embodiments, fingerprints for a document may be obtained from local storage and not from capture system. The fingerprints may be received prior to the request. The fingerprints may be identified locally based on matching a document to the document (e.g., a second document) associated with the fingerprints. Similar to step 304, fingerprints can include strong fingerprints, weak fingerprints, or a combination thereof. The fingerprints for the requested document may be generated in a manner similar to that disclosed herein, such as step 304.

In some embodiments, a response may include a set of hashed data portions (e.g., a second set of hashed data portions) identified for a document matching that identified by the request. The set of hashed data portions may include a first hashed data portion generated using a weak hash function and includes a second hashed data portion generated using a strong hash function. The first hashed data portion and the second hashed data portion are generated for a same portion of the data in the first electronic document. In some embodiments, a hashed data portion using a weak hash function and a hashed data portion using a strong hash function may be generated for each of the data portions in the document.

At step 310, the set of hashed data portions ("fingerprints") generated at step 304 are compared to the set of hashed data portions ("fingerprints") received at step 308. The hashed data portions are compared to determine which data portions, if any, of a document are different or have changed. In some embodiments, all of the weak fingerprints and the strong fingerprints may be compared in each of the set of hashed data portions. Different data portions of the document accessed at step 302 may be identified as being new or updated based on fingerprints not matching for those data portions. Fingerprints may be compared based on one or more criteria (e.g., a similarity threshold). Fingerprints may be identified as matching when the criteria are satisfied.

Comparing the hashed data portions may include comparing the weak hashed data portion for each of the plurality of data portions for the first electronic document accessed at step 302 to the weak hashed data portion for each of the plurality of data portions in the second electronic document for which the set of hashed data portions received at step 308. In other words, the weak fingerprints for the document accessed at step 302 may be compared to the weak fingerprints received from the second computer system. In at least one embodiment, the comparing may include identifying, based on comparing the weak hashed data portions for each of the plurality of data portions in the first electronic document, a first set of data portions in the first electronic document. Each of the first set of data portions may be identified for the weak hashed data portion matches a different weak hashed data portion in the second set of hashed data portions for a second set of data portions in the second electronic document.

For weak fingerprints that match, strong fingerprints may be compared for documents. The strong fingerprints may not be generated at step 304, and instead may be generated for those data portions of the document for which weak fingerprints are identified as matching. Such a technique may minimize consumption of processing resources, especially on a mobile device, where resources are limited. The strong fingerprints may be compared to the strong fingerprints for the document received from the second computer system. In at least one embodiment, after identifying the first set of data portions, the comparing may include comparing the strong hashed data portion corresponding to each of the first set of data portions to the strong hashed data portion of a data portion in the second set of data portions having the weak hashed data portion which matched the weak hashed data portion of the data portion in the first set of data portions. The data portions corresponding to the strong hashed data portions may be identified as data portions matching content likely to appear in the documents being compared.

Based on the comparison, at step 312, one or more data portions of the document accessed at step 302 are identified as being changed or different from the second electronic document for which fingerprints are received at step 308. In at least one embodiment, one or more data portions of the first electronic document are different from data portions in the second electronic document. The data portions may be identified as those for which fingerprints do not match, i.e. the data portions identified by the fingerprints obtained from the second computer system differ from the data portions of the document accessed at step 302. Data portions may be identified as being different based on the comparison performed at step 310.

Data portions may be identified as different if their weak fingerprints do not match any of the weak fingerprints obtained from the capture system for a matching document. In one example, based on determining that a hashed data portion of a first data portion in a plurality of data portions in the first electronic document does not match any weak hashed data portion in the second set of hashed data portions, the first data portion is identified for inclusion in the one or more data portions of the first electronic document that are different from the second electronic document. In other words, a data portion may be identified as different upon determining that its weak fingerprint does not match any of the weak fingerprints obtained from the capture system.

As discussed above, after matching weak fingerprints, strong fingerprints may be compared for those data portions having matching weak fingerprints. The data portions may be identified as different if their strong fingerprints do not match any of the strong fingerprints obtained from the capture system. In at least one embodiment, a second data portion of the plurality of data portions in the first electronic document may be identified for inclusion in the one or more data portions of the first electronic document that are different from the second electronic document, where the second data portions is identified based on determining that the strong hashed data portion for the second data portion does not match the strong hashed data portion of the data portion in the second set of data portions. After determining that a strong fingerprint for a data portion does not match a strong fingerprint for that portion based on their weak fingerprints matching, the data portion may be identified as being different.

At step 314, the identified (i.e., changed or different) data portions of the document are sent to the second computer system (e.g., a capture system). The data portions may be identified as changed or different at step 312. By sending only the data portions that have changed, a device implementing workflow 300 may minimize an amount of computing resources to communicate with a capture system. Moreover, the device may be able to limit use of communication bandwidth over a network, by sending only data related to data portions that have changed. The capture system can determine the contents of a document based on the data portions that have changed and the fingerprints of the document for which the content has changed. Workflow 300 can end at step 314.

Upon the capture system receiving the data portions of the document, the capture system may implement a set of instructions to reconstruct the document. In some embodiments, the fingerprints (e.g., the hashed data portions) that matched earlier, may be identified as part of workflow 200. For example, one or more hashed data portions may be identified of a first set of hashed data portions that a match any of the second set of hashed data portions. The fingerprints that are identified as matching may be sent to the second computer system along with the identified hashed data portions that do not match the hashed data portions obtained from the second computer system. In some embodiments, the identified hashed data portions may be sent to the second computer system with information indicating a process to generate the electronic document accessed at step 302. The second computer system can associate the one or more identified data portions as updated to the electronic document for which hashed data portions were received from the second computer system. The second computer system can generate the electronic document (e.g., the first electronic document accessed at step 302) based on the identified data portions. In some embodiments, the second computer system may generate the electronic document also using the information indicating the process and the hashed data portions that matched. For example, the second computer system may construct a document (e.g., a third document) based on the one or more data portions of the second electronic document and the identified data portions. The third electronic document is constructed as an update to the first electronic document having as at least a portion of the first electronic document and the one or more data portions of the second electronic document that are received from the client.

In some embodiments, the second computer system may copy, from the most likely to appear content, the data portions of the document where there were no changes. Then, the capture system may determine the data portions that did not match with the most likely to appear content (i.e., the capture system may move a sliding window, but the data portions received from the client did not match with any of the selected data portions of text most likely to appear). The determined data portions of the document are what were changed from what was originally sent to the client. Accordingly, the capture system can inserts the data portions provided in the unmatched section in the reconstructed document. For example, if the first data portion that did not have any change is data portion 0 and the next data portion that did not have any change is data portion 1, and the unmatched data portion is received after data portion 0, the content of the unmatched data portion is inserted between data portion 0 and data portion 1. In one embodiment, the capture system may store the fully reassembled document. Other embodiments may store the client response in the compressed delta encoding format for reduced storage.

V. Document Signature Generation

Figure 4:
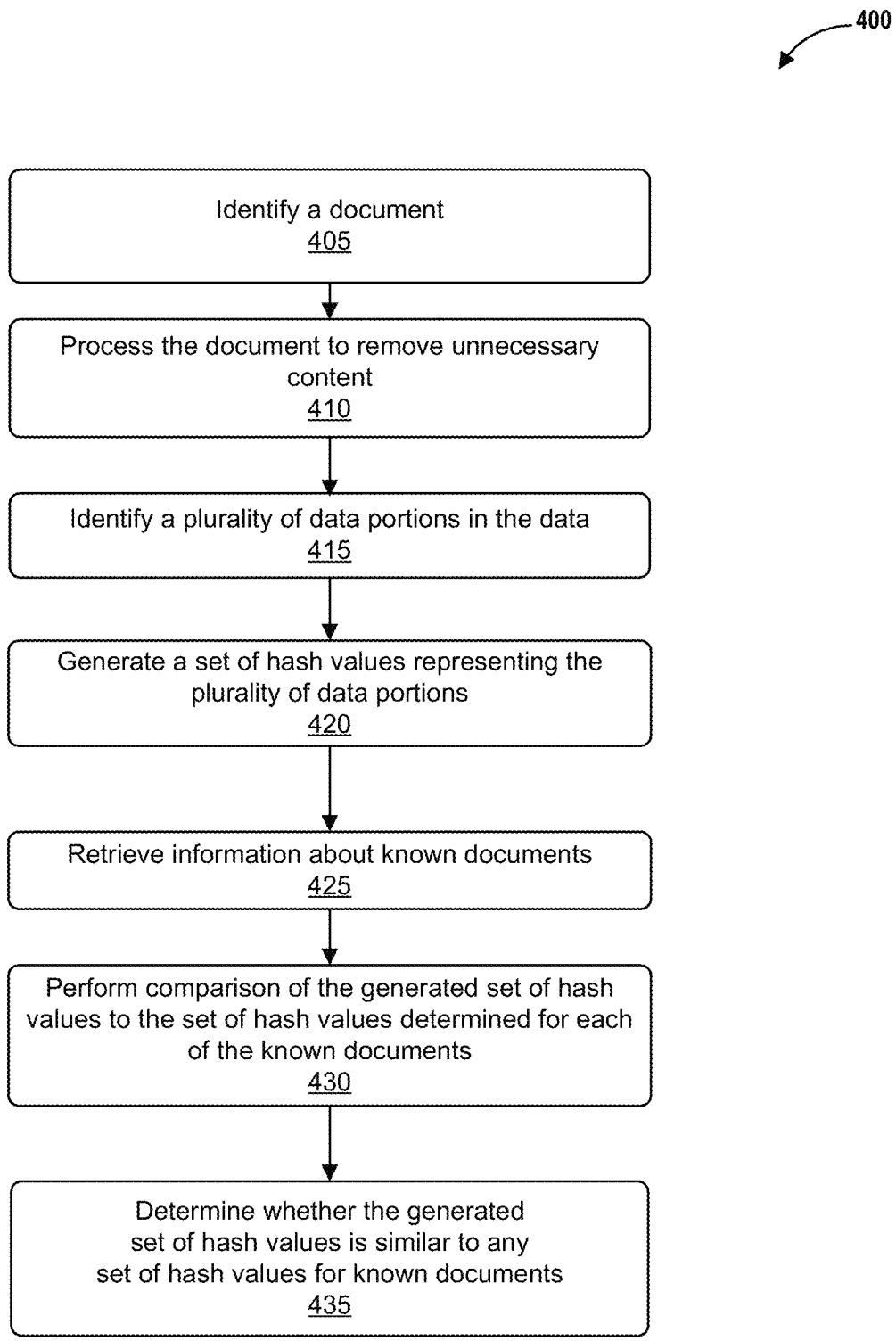
FIG. 4 illustrates a workflow of a process for determining information identifying a document according to some embodiments.

Now turning to FIG. 4 is an example of a workflow 400 of a process for determining information identifying a document according to some embodiments. The information, or "signature," may be used to uniquely identify a document. The signature may be associated with the document. Documents may be compared by their signatures, each individually generated, to determine whether any two documents match. A client and a capture system may use signatures to identify documents to be compared as disclosed herein.

In at least one embodiment, a capture system may implement all or part of workflow 400. For example, as part one a process disclosed herein, the capture system may receive information identifying a document accessed by a client. The capture system may perform workflow 400 to determine whether any known document matches the accessed document. Based on determining that a known document matches the accessed document, the capture system can provide the client with fingerprints for the matching document as described in other embodiments. The set of hash values for known documents may be generated in advance of receiving a request from a client. The known documents may be identified based on a part of the information identifying the accessed document, such as a URL of the accessed document.

Workflow 400 may begin at step 405, a document may be identified for processing to determine its signature. A document may be identified by its signature. The signature of a document may be defined by information about the document. The document may include content, which may define the document. The data for a document may include metadata, or other information in addition to the content. A document accessed at a client may have text. Most of the content of the document may be similar between computer systems requesting the content (e.g., requesting a web page for the same URL). However, some communications from web servers may serve dynamic data and responses that differ by varying amounts. In order to efficiently identify changes of the content between communications, some embodiments may perform a comparison of the content in a communication to known documents using techniques disclosed herein. As discussed above, a known document may store content from previous communications. The comparison may occur using a set of data portions (e.g., tokens) that are identifiable in the content of a document. A data portion may include one or more characters, such as a string of characters. The characters may be identified as a token. A set of tokens in a communication may divide the content in a document. Specifically, content that is tokenized may be easily compared and stored.

At step 410, a document may be processed to remove unnecessary content. Unnecessary content may include content that does not define a resource in the communication. For example, unnecessary content may include metadata or formatting data of a resource in the communication. The unnecessary content may be identified and extracted using techniques known by a person skilled in the art. For example, content to be removed may be identified and extracted by parsing data such as information for displaying the document or accessing the document. Unnecessary content such as metadata may be identified based on a known format. Removing unnecessary content may assist in the identification of content in the document.

At step 415, a plurality of data portions are identified in a document. Each of the plurality of data portions may form a portion of content in the document. In some instances, one or more of the data portions may include formatting of the content. In some embodiments, a plurality of data portions may be a plurality of tokens identified by parsing content in the document. A plurality of data portions may be identified by implementing techniques disclosed herein. For example, a plurality of data portions may be identified by parsing the content using one or more delimiters by implementing techniques disclosed herein.

In at least one embodiment, content in a document may be parsed to identify a plurality of data portions (e.g., a plurality of tokens), each data portion corresponding to a token of data. For example, when content is a text document, the plurality of data portions may be identified by parsing the content using one or more delimiters. Where content is an HTML document, delimiters such as a space (' '), '<', and '>' may be used to parse the content to identify the plurality of data portions. Delimiters may be chosen to optimize computing performance. The choice of delimiters may impact processing performance during processing for comparison of content to templates. The choice of delimiters may be based on the type of content and/or format of content (e.g., HTML or Javascript).

In at least one embodiment, content in a document may be parsed into tokens. The tokens may be the data portions identified for a document. In some embodiments, content in a document may be parsed using one or more delimiters. A document may include content that includes tags for formatting. A delimiter may be defined as a pre-determined token, such as the examples discussed below. The tokens used for parsing may be selected based on a format of the content. The parsed content may be useful for comparing content to a known document. Care should be considered for determining the tokens to use for parsing content to ensure an optimal trade off of size and effectiveness of dividing the document. The use of too many tokens can lead to more work in processing and less meaning with regard to identifying like changes across multiple documents. By using too few tokens, the difference algorithm results in modifications that are clustered in too large of a change to make the processing and comparison efficient.

In one embodiment where a document is a web text document, the tokens may include '<', '>', ';', '{', '}', '[', ']', ',', ':', '\n'. A combination of tokens may be based on the above conditions, enabling a balance of the effects of the algorithm in capturing discreet changes in a resource having JavaScript, CSS, HTML, and web content. In some embodiments, parsing a document using tokens such as a space (' '), '<', or '>' may maximize CPU performance for parsing. Often, differences between requests to the same web page from multiple clients are due to content changes. For example, one user may have "Welcome back, Joe", while another user may have "Welcome back, Sally". To record the differences in a compact format, it is beneficial to compare the template to the content portions of a web document received in a communication. By selecting the appropriate tokens, the content can be separated from the formatting tags. A document is shown as an example of the web response document of divided using the preferred tokens discussed above. By dividing content using the preferred tokens, the elements of the content can be easily compared to a template to enable an optimally short edit script to be created. By tokenizing the document in this format, the content is separated from the formatting tags.

At step 420, a set of hash values may be generated to represent the plurality of data portions. The set of hash values may be associated with the document as its signature, or information identifying the document. The set of hash values may be generated using a hashing algorithm. In some embodiments, the hashing algorithm is a minimum hashing ("MinHash") algorithm, which can be used to determine the similarity of two data sets. Techniques for comparing data sets are disclosed herein for determining the similarity of the plurality of data portions between two documents. As part of determining the similarity of two data sets, a set of hash values may be generated for the plurality of data portions to be compared later to a document requested by a client.

In at least one embodiment, a min hash algorithm may be implemented to generate the set of hash values for the plurality of data portions. The set of hash values may correspond to the set of minimum hash values generated for the plurality of data portions for implementing the min hash algorithm. Initially, a shingle length value may be determined, where the shingle length value is a value that defines a group of data portions of the plurality of portions, the group being the number of consecutive data portions of the plurality of data portions that will be processed using the algorithm. Determination of shingle length value may be based on processing performance considerations, such as the size of content defined by the number of data portions. One or more hashing algorithms may be performed against each of the data portions in a group of data portions defined by the shingle length value. The number of hashing algorithms applied to a group of data portions may be based on processing performance considerations, such as processing performance for comparison of content with a template. The hashing algorithms may be applied to each of the data portions in all of the groups of data portions identified based on the shingle length value.

Upon determining a shingle length, one or more groups of data portions are identified in the plurality of data portions based on the shingle length. Each group of data portions is identified based on the shingle length value as one or more different consecutive data portions in the plurality of data portions. For example, a group of data portions may be five consecutive data portions when the shingle length value is five. For each group of data portions, one or more hashing algorithms are performed for each data portions in the group of data portions defined by a shingle length value. In at least one embodiment, for the number of hashing algorithms applied to each group of data portions, each of the hashing algorithms may be applied to each data portion in the group. The result of the application of the hashing algorithms to a data portion are used as a seed to the next data portion. The result of applying the hashing algorithms to the next data portion is used as a seed for the next data portion and so on in the group of data portions until the group of data portions are processed for the hashing algorithms. As an example, the shingle length is five and the number of hashing algorithms is 100. For a group of five data portions (e.g., five tokens), a 100 hashing algorithms will be applied to each token, taking the resulting value of each and applying it to the next token in the group. So in other words, hashing algorithms will be applied across the five tokens in the group.

In some embodiments, for each one of the different hashing algorithms applied to each data portion in the group of data portions, an algorithm (e.g., a themed algorithm) may then be applied such that a minimum hash value of each of the data portions, based on application of the hashing algorithms to the group, will be generated across all of the data portions in the group. The themed algorithm may be applied to each of the next groups of data portions. A set of hash values may be determined for each of the plurality of data portions. The set of hash values may be the minimum hash values generated for each of the data portions of the groups of data portions.

In some embodiments, the generated set of hash values may be transmitted from one computer (e.g., client device 102) to another computer (e.g., computer system 130). The set of hash values may be generated at a client based on data obtained by the client. As such, to minimize sending all of the data of a communication to computer system 130, the client may send the generated set of hash values, which can be used for comparison with hash values, or signatures, of known documents identified by computer system 130 as further detailed below. By sending the set of hash values instead of the content in a communication, the amount of bandwidth consumed is minimized for retransmission of content for template generation. In other words, the client can minimize use of network bandwidth by sending the generated hash values instead of the actual content, which may consume more bandwidth.

At step 425, information identifying known documents, if any are stored, may be retrieved. The information may include a set of hash values generated for each of the documents. The documents may be known for a website. The documents may be identified on the basis of information identifying the document identified at step 405. A data store with the information identifying known documents may be accessed to obtain the data identifying those documents. In some embodiments, documents may be identified based on information for the identified document at step 405. For example, known may be identified based on a URL or an element of a URL of the identified document. In some embodiments, a set of hash values may be determined for each of the known documents. A set of hash values for a known document may be generated using a hashing algorithm as applied at step 420. In some embodiments, the set of hash values generated for a known down may be stored in association with the known document. The set of hash values for the known document may be generated at the first instance the document is identified. As will be explained below, the set of hash values for each known document can be compared to the set of hash values generated for the document identified at step 405.

At step 430, a comparison is performed between the set of hash values generated at step 420 and the set of hash values for each of the known document. Any number of comparison techniques may be applied as known by a person skilled in the art. A result may be generated based on the comparison. A result value may be generated that indicates a measure of the difference or the similarity between the content in the communication and the template. A result may indicate the value(s) that are different between the sets of hash values that are compared.

At step 435, a determination is made whether the generated set of hash values is similar to any of the set of hash values determined for the known documents. A determination that the sets of hash values may be similar may be based on whether the sets of hash values match exactly. A similarity metric analysis may be performed to determine a similarity metric. The similarity metric may be computed using one or more of a Jaccard Index or other method of similarity analysis known to a person skilled in the art. One or more comparison criteria may be defined for comparison of the sets of hash values. The criteria may be selected to achieve a desired balance of compression with respect to storage. The similarity analysis can be assessed based on the criteria to determine whether the sets of hash values are similar. For example, the comparison criteria may include a similarity threshold (e.g., a value defining a percentage of similarity). The result (e.g., similarity metric) of the similarity analysis may be assessed in view of the similarity threshold, such that the sets of hash values may be deemed similar when the similarity threshold is satisfied.

More criteria or criteria (e.g., a higher similarity threshold) that are harder to satisfy may achieve better compression, but may result in additional storage as new known documents are likely to be created. Less strict criteria (e.g., a lower similarity threshold) may result in use of less storage but less effective compression per communication.

Workflow 400 can end at step 435.

FIGS. 5A, 5B, 5C, and 5D illustrate an implementation where FIG. 5A illustrates a web document 500 that the client may request from the web server. FIGS. 5B and 5C illustrate the fingerprints generated for the most likely to appear content of the requested document (along with the corresponding most likely to appear content). As illustrated in FIGS. 5B and 5C, the web document 500 is divided into seven data portions (or chunks) 512, 522, 532, 542, 552, 562, 572, each having a fixed size (e.g. 250 characters) as a data portion. These data portions illustrate the most likely to appear content when the requested web document 500 is displayed on the client device. Corresponding fingerprints 510, 520, 530, 540, 550, 560, 570 are generated for each of the seven data portions 512, 522, 532, 542, 552, 562, 572, respectively. FIG. 5D illustrates the client representation 580 of the requested web document 500 using the fingerprints 510, 520, 530, 540, 550, 560, 570. Client representation 580 is shown in plain/human readable text for demonstrative purposes; however, binary format could further reduce size sent.

VI. Capture System Example

One of ordinary skill in the art will appreciate that the following examples are provided for illustration purposes and should not be construed as limiting.

A client may request a webpage of 100 kilobyte. According to some embodiments, the client may then request the fingerprints from the capture system for the particular webpage's URL. The capture system may have previously divided a previous capture of that webpage's URL into 10 equal data portions of 10 kilobyte each. As provided above, the data portions may be of different sizes and/or the webpage may be divided based on content instead of size. The capture system may have generated a strong and weak fingerprint for each of the 10 data portions. The capture system may send the sets of fingerprints for the 10 data portions to the client.

After the client receives the sets of fingerprints, the client may analyze its own copy of the document, e.g. its own HTML. At first, the client may calculate the weak fingerprint (i.e. weak rolling hash) for the first data portion starting from byte 0 to byte 9,999. The client may then check if that weak fingerprint matches any of the weak fingerprints received from the capture system. If the weak fingerprints match, then the client may check the strong fingerprint generated by the client against the strong fingerprint received from the capture system for the data portion where the weak fingerprints matched (i.e. the data portion starting at byte 0). If the strong fingerprints match as well, then the client may conclude that there were no changes for the chuck starting at byte 0.

On the other hand, if the weak fingerprints do not match, then the client may check the next data portion. In this example, the client has a sliding window of 1 byte. Thus, if just a few bytes were added at the beginning of the client document, perhaps by a client-side browser plugin, the added text will be sent before the client found the original data portion and sent its matching fingerprint to represent the match.

Even if blocks (e.g. bytes) are added or removed in-between the data portions, all the data portions after the changed data portions will still match because the client is checking a sliding window. If the changes are made in the middle of a data portion, the entire text until encountering a matching data portion is sent back to the server.

Upon receipt of the changed portions from the client, the server reconstructs the document. First, the server copies, from the most likely to appear content, the data portions of the document where there were no changes. Then, the server inserts the text provided in the unmatched section in the reconstructed document.

VII. General Computer System

Figure 6:
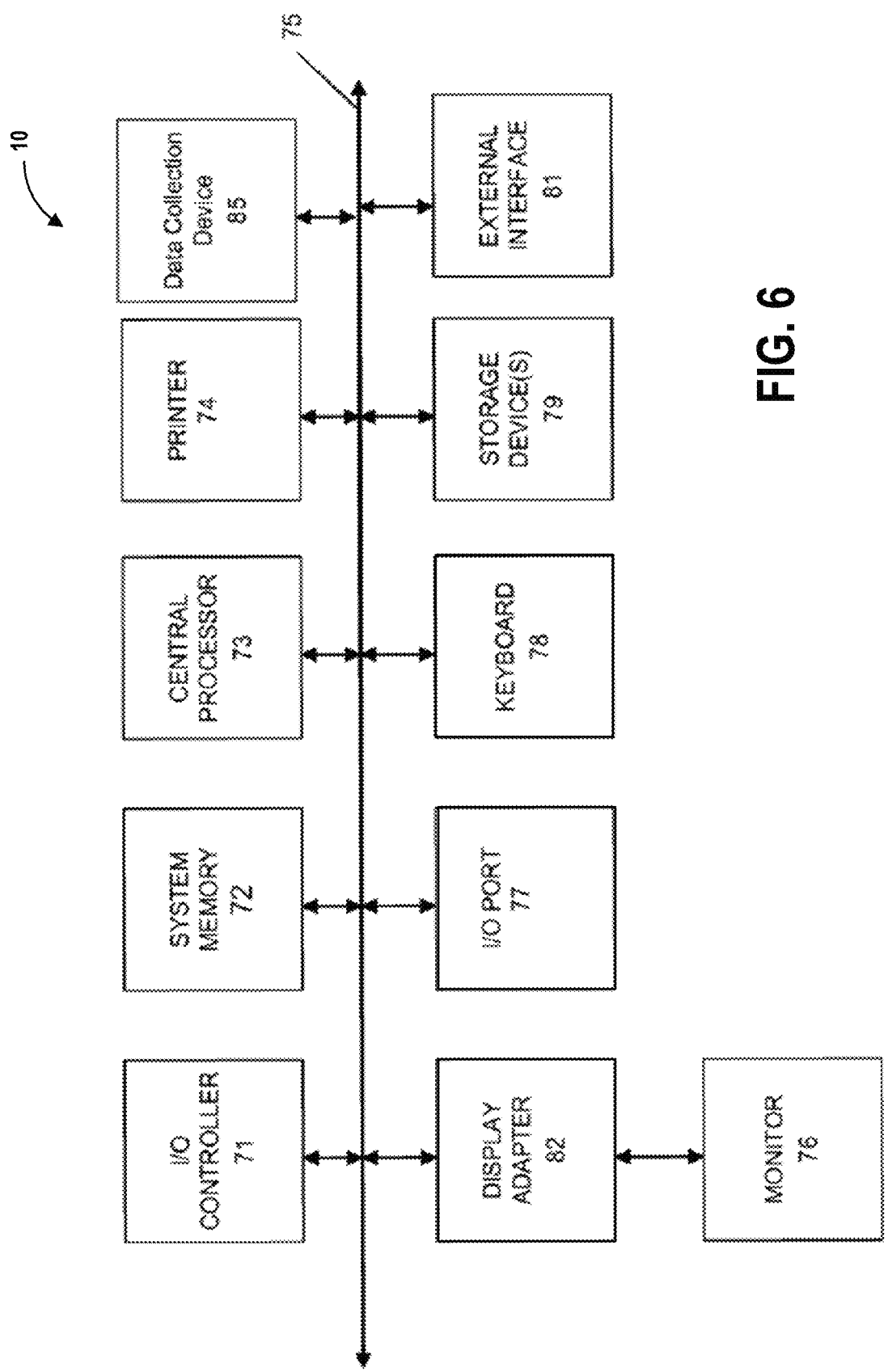
FIG. 6 shows a block diagram of an example computer system usable to implement techniques according to some embodiments.

Any of the computer systems mentioned herein may utilize any suitable number of subsystems. Examples of such subsystems are shown in FIG. 6 in computer apparatus 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 6 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional, functional, and/or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The features and advantages described in the detailed description are not all inclusive and, in particular, many additional features and advantages will be apparent to one of ordinary skill in the art in view of the drawings, detailed description, and claims. Moreover, it should be noted that the language used in the detailed description has been principally selected for readability and instructional purposes, and may not have been selected to delineate or circumscribe the inventive subject matter.

Note that in this description, references to "one embodiment," "an embodiment" or "some embodiments" mean that the feature being referred to is included in at least one embodiment of the present disclosure. Further, separate references to "one embodiment" or "some embodiments" in this description do not necessarily refer to the same embodiment(s); however, neither are such embodiments mutually exclusive, unless so stated and except as will be readily apparent to those skilled in the art. Thus, the present disclosure can include any variety of combinations and/or integrations of the embodiments described herein. However, other embodiments of the present disclosure may be directed to specific embodiments relating to each individual aspect, or specific combinations of these individual aspects.

Upon reading this detailed description, those of skill in the art will appreciate still additional alternative structural and functional designs for a system and method for compact data storage of network traffic and efficient search through the disclosed principles of the present disclosure. Thus, while particular embodiments and applications of the present disclosure have been illustrated and described, it is to be understood that the present disclosure is not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the present disclosure as defined in the appended claims.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A computer-implemented method performed by a client device during a web session, the computer-implemented method comprising:
   accessing, by the client device from a first computer system hosting a website, a first electronic document identified by a resource indicator;
   generating, by the client device, a first set of hashed data portions corresponding to the first electronic document, wherein each of the first set of hashed data portions corresponds to a different portion of data in the first electronic document;
   sending, by the client device to a second computer system, a request for one or more hashed data portions corresponding to the first electronic document, the request including information identifying the first electronic document;
   receiving, by the client device, from the second computer system, a second set of hashed data portions responsive to the request, wherein each of the second set of hashed data portions are generated based on a different portion of data in a second electronic document, and wherein the second set of hashed data portions are identified as responsive to the request based on determining that the second electronic document matches the first electronic document identified by the information in the request, wherein the first electronic document and the second electronic document comprise web documents;
   comparing the first set of hashed data portions to the second set of hashed data portions;
   identifying, based on the comparing, one or more data portions of the first electronic document that are different from the second electronic document; and
   sending, to the second computer system, the one or more data portions of the first electronic document as updates to the second electronic document, wherein the second computer system associates the one or more data portions as updates to the second electronic document, the updates to the second electronic document specifying user interactions with the first electronic document during the web session.

2. The computer-implemented method of claim 1, wherein the first set of hashed data portions includes a first hashed data portion generated using a weak hash function and includes a second hashed data portion generated using a strong hash function, wherein the first hashed data portion and the second hashed data portion are generated based on a same portion of data in the first electronic document, wherein the weak hash function is defined by a first threshold measure of collisions and the strong hash function is defined by a second threshold measure of collisions, and wherein the first threshold measure of collisions is greater than the second threshold measure of collisions.

3. The computer-implemented method of claim 1, wherein the second set of hashed data portions includes a first hashed data portion generated using a weak hash function and includes a second hashed data portion generated using a strong hash function, wherein the first hashed data portion and the second hashed data portion are generated for a same portion of data in the second electronic document, wherein the weak hash function is defined by a first threshold measure of collisions and the strong hash function is defined by a second threshold measure of collisions, and wherein the first threshold measure of collisions is greater than the second threshold measure of collisions.

4. The computer-implemented method of claim 1, wherein each of a subset of the first set of hashed data portions and each of a subset of the second set of hashed data portions are generated by a sliding window technique using a weak hash function.

5. The computer-implemented method of claim 1, wherein the first set of hashed data portions includes a weak hashed data portion and a strong hashed data portion for each of a plurality of data portions in the first electronic document, and wherein the second set of hashed data portions includes a weak hashed data portion and a strong hashed data portion for each of a plurality of data portions in the second electronic document.

6. The computer-implemented method of claim 5, wherein comparing the first set of hashed data portions to the second set of hashed data portions includes:
   comparing the weak hashed data portion for each of the plurality of data portions in the first electronic document to the weak hashed data portion for each of the plurality of data portions in the second electronic document;
   identifying, based on the comparing the weak hashed data portion for each of the plurality of data portions in the first electronic document, a first set of data portions in the first electronic document, each of the first set of data portions for which the weak hashed data portion matches a different weak hashed data portion in the second set of hashed data portions for a second set of data portions in the second electronic document; and comparing the strong hashed data portion corresponding to each of the first set of data portions to the strong hashed data portion of a data portion in the second set of data portions having the weak hashed data portion which matched the weak hashed data portion of the data portion in the first set of data portions.

7. The computer-implemented method of claim 6, wherein the identifying, based on the comparing, one or more data portions of the first electronic document that are different from the second electronic document includes:

based on determining that the weak hashed data portion of a first data portion in the plurality of data portions in the first electronic document does not match any weak hashed data portion in the second set of hashed data portions, identifying the first data portion for inclusion in the one or more data portions of the first electronic document that are different from the second electronic document; and identifying a second data portion of the plurality of data portions in the first electronic document for inclusion in the one or more data portions of the first electronic document that are different from the second electronic document, wherein the second data portion is identified based on determining that the strong hashed data portion for the second data portion does not match the strong hashed data portion of the data portion in the second set of data portions.

8. The computer-implemented method of claim 1, further comprising:

identifying one or more hashed data portions of the first set of hashed data portions that match any of the second set of hashed data portions; and wherein the one or more data portions are sent to the second computer system along with the one or more hashed data portions.

9. The computer-implemented method of claim 8, wherein the one or more data portions are sent to the second computer system along with information indicating a process to generate the first electronic document using the one or more data portions and the one or more hashed data portions.

10. The computer-implemented method of claim 1, further comprising:

parsing the first electronic document to identify a plurality of data portions in the first electronic document; and generating, a set of hash values for the plurality of data portions, wherein the set of hash values is generated based on applying one or more hashing algorithms to the plurality of data portions, wherein the information identifying the first electronic document includes the generated set of hash values.

11. The computer-implemented method of claim 10, wherein the first set of hashed data portions are generated based on the plurality of data portions, and wherein each of the first set of hashed data portions corresponds to a different one of the plurality of data portions.

12. The computer-implemented method of claim 10, wherein determining that the second electronic document matches the first electronic document includes determining that the generated set of hash values matches a threshold number of hash values in a set of hash values generated for the second electronic document, and wherein each of the set of hash values is generated for a different one of a set of data portions of data in the second electronic document.

13. The computer-implemented method of claim 10, wherein the plurality of data portions are identified in the first electronic document by parsing the first electronic document based on a size of the first electronic document.

14. The computer-implemented method of claim 1, wherein the second set of hashed data portions is generated for a set of data portions in the second electronic document, and wherein each of the set of data portions satisfies a threshold frequency for appearing in the second electronic document.

15. The computer-implemented method of claim 1, wherein the second set of hashed data portions is generated for a set of data portions in the second electronic document, and wherein each of the set of data portions satisfies a threshold frequency for appearing in electronic documents related to the first electronic document identified by the resource indicator.

16. The computer-implemented method of claim 1, wherein accessing the first electronic document from the first computer system includes:

sending, to the first computer system, a hypertext transfer protocol (HTTP) request for the first electronic document, wherein the HTTP request includes the resource indicator; and receiving an HTTP response, wherein the HTTP response includes the first electronic document identified by the resource indicator, wherein the HTTP response includes one of a hypertext markup language (HTML) document or a document including JavaScript.

17. A system, comprising:

one or more processors;

a memory accessible to the one or more processors, the memory comprising instructions that, when executed by the one or more processors, causes the one or more processors to:

access, from a first computer system during a web session, a first electronic document identified by a resource indicator;

generate a first set of hashed data portions corresponding to the first electronic document, wherein each of the first set of hashed data portions corresponds to a different portion of data in the first electronic document;

send, to a second computer system, a request for one or more hashed data portions corresponding to the first electronic document, the request including information identifying the first electronic document;

receive, from the second computer system, a second set of hashed data portions responsive to the request, wherein each of the second set of hashed data portions are generated based on a different portion of data in a second electronic document, and wherein the second set of hashed data portions are identified as responsive to the request based on determining that the second electronic document matches the first electronic document identified by the information in the request, wherein the first electronic document and the second electronic document comprise web documents;

compare the first set of hashed data portions to the second set of hashed data portions;

identify, based on the comparing, one or more data portions of the first electronic document that are different from the second electronic document; and send, to the second computer system, the one or more data portions of the first electronic document as updates to the second electronic document, wherein the second computer system associates the one or more data portions as updates to the second electronic document, the updates specifying user interactions with the first electronic document during the web session.

18. The system of claim 17, wherein the one or more processors and the memory are included in a mobile communication device, and wherein the first computer system is a web server computer and is different from the second computer system.

19. A computer-implemented method performed by a computer system during a web session, the computer-implemented method comprising:
- determining, by the computer system, identification data for a first electronic document stored in association with a resource indicator associated with a website hosted by a separate server computer, the first electronic document corresponding a webpage of the website;
- identifying, by the computer system, a set of data portions in the first electronic document;
- generating, by the computer system, a set of hashed data portions for the set of data portions in the first electronic document, wherein each of the set of hashed data portions are generated based on a different portion of the set of data portions;
- receiving, by the computer system from a client device, a request for one or more hashed data portions corresponding to a second electronic document, the request including information identifying the second electronic document, the first electronic document and second electronic document comprising web documents;
- determining that the second electronic document matches the first electronic document based on the information identifying the second electronic document matching the identification data for the first electronic document;
- responsive to determining that the second electronic document matches the first electronic document, sending the set of hashed data portions to the client device;
- receiving, by the computer system, from the client device, one or more data portions of the second electronic document that are different from the first electronic document, wherein the one or more data portions are identified using the set of hashed data portions sent to the client device, the one or more data portions indicating user interactions of a user of the client device with the website; and
- constructing, by the computer system, a third electronic document based on the one or more data portions of the second electronic document that are different from the first electronic document and the set of data portions, wherein the third electronic document is constructed as an update to the first electronic document for replay of the user interactions with the website and having as at least a portion of the first electronic document and the one or more data portions of the second electronic document that are received from the client device.

20. The computer-implemented method of claim 19, wherein the third electronic document is the second electronic document.

* * * * *